US008464043B2

(12) United States Patent
Matsushima et al.

(10) Patent No.: US 8,464,043 B2
(45) Date of Patent: Jun. 11, 2013

(54) INFORMATION SECURITY DEVICE AND INFORMATION SECURITY SYSTEM

(75) Inventors: Hideki Matsushima, Osaka (JP); Yuichi Futa, Osaka (JP); Hisashi Takayama, Osaka (JP); Takayuki Ito, Osaka (JP); Tomoyuki Haga, Nara (JP); Taichi Sato, Kyoto (JP)

(73) Assignee: Panasonic Corporation, Osaka (JP)

( * ) Notice: Subject to any disclaimer, the term of this patent is extended or adjusted under 35 U.S.C. 154(b) by 552 days.

(21) Appl. No.: 12/666,375

(22) PCT Filed: Jun. 23, 2008

(86) PCT No.: PCT/JP2008/001614
§ 371 (c)(1),
(2), (4) Date: Jun. 28, 2010

(87) PCT Pub. No.: WO2009/001539
PCT Pub. Date: Dec. 31, 2008

(65) Prior Publication Data
US 2010/0268936 A1  Oct. 21, 2010

(30) Foreign Application Priority Data
Jun. 25, 2007  (JP) .................................. 2007-166320

(51) Int. Cl.
*H04L 29/06* (2006.01)
(52) U.S. Cl.
USPC .................. 713/153; 726/2; 726/26; 380/259
(58) Field of Classification Search
USPC ....... 726/2–4, 26–27; 713/150, 153; 380/255, 380/259, 270
See application file for complete search history.

(56) References Cited

U.S. PATENT DOCUMENTS

| 4,223,403 A  * | 9/1980 | Konheim et al. ............... 705/72 |
| 6,931,532 B1 * | 8/2005 | Davis et al. .................... 713/167 |
| 7,562,052 B2 * | 7/2009 | Dezonno ......................... 705/71 |

(Continued)

FOREIGN PATENT DOCUMENTS

| JP | 2002-9762 | 1/2002 |
| JP | 2005-102188 | 4/2005 |
| JP | 2007-19688 | 1/2007 |
| WO | 2006/092840 | 9/2006 |

OTHER PUBLICATIONS

International Search Report issued Oct. 7, 2008 in International (PCT) Application No. PCT/JP2008/001614.

(Continued)

*Primary Examiner* — Beemnet Dada
*Assistant Examiner* — John B King
(74) *Attorney, Agent, or Firm* — Wenderoth, Lind & Ponack, L.L.P.

(57) ABSTRACT

Provided is a migration system considering security authentication levels and data protection strength levels of the both security devices between which data is migrated. A first terminal includes a mechanism for protecting data by a private key in the public key method held by TPM, and a second terminal includes a key in the private key method encrypted by the private key in the public key method held by TPM and a mechanism for protecting the data by the key. A Migration Authority holds a security policy table describing a security policy and judges whether data movement from the first terminal to the second terminal is enabled according to the security policy table.

18 Claims, 19 Drawing Sheets

U.S. PATENT DOCUMENTS

| | | | |
|---|---|---|---|
| 2002/0077984 A1* | 6/2002 | Ireton | 705/51 |
| 2002/0150248 A1* | 10/2002 | Kovacevic | 380/210 |
| 2002/0169717 A1* | 11/2002 | Challener | 705/40 |
| 2004/0136533 A1* | 7/2004 | Takagaki et al. | 380/255 |
| 2005/0222963 A1* | 10/2005 | Johnson | 705/67 |
| 2005/0271211 A1* | 12/2005 | Takemura | 380/277 |
| 2006/0018468 A1* | 1/2006 | Toba et al. | 380/200 |
| 2007/0008568 A1* | 1/2007 | Senoh | 358/1.14 |
| 2007/0094719 A1* | 4/2007 | Scarlata | 726/9 |
| 2008/0046581 A1* | 2/2008 | Molina et al. | 709/229 |
| 2008/0216177 A1* | 9/2008 | Yokosato et al. | 726/26 |
| 2009/0080870 A1* | 3/2009 | Mudie et al. | 386/131 |

OTHER PUBLICATIONS

Interoperability Specification for Backup and Migration Services Version 1.0 Final Revision 1.0 (TCG Published), Jun. 30, 2005.

Information technology—Security techniques—Evaluation criteria for IT security—Part 1: Introduction and general model, International Standard ISO/IEC 15408-1, Third edition Dec. 15, 2009.

TPM Main Part 1 Design Principles, Specification Version 1.2, Revision 94, TCG Published, Mar. 29, 2006.

TPM Main Part 2 TPM Structures, Specification Version 1.2, Level 2 Revision 94, TCG Published, Mar. 29, 2006.

TPM Main Part 3 Commands, Specification Version 1.2, Level 2 Revision 94, TCG Published, Mar. 29, 2006.

TCG Software Stack (TSS) Specification Version 1.2, Level 1 Part 1: Commands and Structures, Errata A, Jan. 6, 2006.

TCG Specification Architecture Overview, Specification Revision 1.2, Apr. 28, 2004.

Japanese Office Action issued Aug. 21, 2012 in related Japanese Patent Application No. 2007-166320.

* cited by examiner

FIG. 6

Migration Package management table 601

| Migration package ID | File name | SRK type | Cipher type | Key length | Evaluate level |
|---|---|---|---|---|---|
| 001 | ¥migrationp¥mp001.dat | asymmetric | RSA | 2048 | EAL4 |
| 002 | ¥migrationp¥mp002.dat | asymmetric | ECC | 256 | EAL4 |
| 003 | ¥migrationp¥mp003.dat | symmetric | AES | 128 | EAL1 |

FIG. 7

Encryption strength table 701

| Strength level | Key length for private key algorithm | Key length for RSA algorithm | Key length for ECC algorithm |
|---|---|---|---|
| 1 | 80 | 1024 | 160 |
| 2 | 112 | 2048 | 224 |
| 3 | 128 | 3072 | 256 |
| 4 | 192 | 7680 | 384 |
| 5 | 256 | 15360 | 521 |

FIG. 8

Authentication level determination table 801

| Migrate source authentication level | Migrate destination authentication level |
|---|---|
| EAL1 | ANY |
| EAL2 | EAL1 |
| EAL3 | EAL2 |
| EAL4 | EAL3 |
| EAL5 | EAL5 |
| EAL6 | EAL6 |
| EAL7 | EAL7 |
| Others | ANY |

FIG. 16

Content management table 1601

| Content ID | File name |
|---|---|
| 001 | ¥omadrm¥music001.aac |
| .. | .. |
| XXX | ¥omadrm¥musicXXX.aac |

Content management table 1602

| Content ID | File name |
|---|---|
| 00a | ¥omadrm¥music00a.aac |
| 00b | ¥omadrm¥music00b.aac |

US 8,464,043 B2

INFORMATION SECURITY DEVICE AND INFORMATION SECURITY SYSTEM

TECHNICAL FIELD

The present invention relates to a technology for migrating confidential data between security terminals.

BACKGROUND ART

In recent years, a need for a technique to protect data is growing, as an awareness regarding information security becomes high.

Against this background, the Trusted Computing Group (TCG) was established in order to develop and spread a secure computer platform. The TCG has released a technology called Protected Storage for securely storing confidential data with use of a security core module called a Trusted Platform Module (TPM).

Non-Patent Document 1 formulated by the TCG Infrastructure WG discloses a backup method of confidential data stored in a terminal with the Protected Storage technology, and a technology for migrating the confidential data to another terminal.

Non-Patent Document 1: Interoperability Specification for Backup and Migration Services Version 1.0, Revision 1.0 (TCG Published)

DISCLOSURE OF THE INVENTION

The Problems the Invention is Going to Solve

The TPM specification V 1.2 mainly targeting PC has already been formulated and released. Yet, even today, a discussion over the TPM specification is still continued in order to keep up with a latest encryption algorithm and an application thereof which meet the needs of the times. Although these TCG specifications were originally formulated mainly targeting PC, specifications for a mobile device like a mobile phone and a PDA (Personal Data Assistance) are considered now to expand the range of a target. Because an encryption algorithm is advancing while these specifications are being considered, there is a possibility that an encryption algorithm to be adopted varies depending on the target.

The technology for migrating confidential data between terminals disclosed in the Non-Patent Document 1 is based on the premise that data protection methods used by the terminals are all based on the same encryption algorithm. If the terminals use data protection methods based on different encryption algorithms, a mismatch in security strength can occur between the terminals.

Also the TPM specification for PC has been formulated on the premise that security authentication using the ISO/IEC15408 standard and the like is conducted. But this may not be necessary for some targets.

The technology for migrating confidential data between terminals disclosed in the Non-Patent Document 1 is based on the premise that the both terminals have been authenticated at the same level of a security authentication. When the both terminals have been authenticated at a different level, there is a problem of a security authentication level mismatch.

The present invention solves the conventional problem and aims to provide a Migration system and a security terminal capable of solving the mismatch of the security strength and the security authentication level between devices when migrating confidential data between terminals.

Means to Solve the Problems

The stated object is fulfilled by a migration apparatus for migrating confidential data protected in a first terminal to a second terminal, the migration apparatus comprising: a receiving unit operable to receive, from the first terminal, confidential data protected by a first encryption algorithm in a security module in the first terminal, and receive a download request for the confidential data from the second terminal; an identification unit operable to identify the first encryption algorithm by using a credential transmitted from the first terminal, and identify a second encryption algorithm used in a security module in the second terminal by using a credential transmitted from the second terminal; a holding unit holding a security policy table that indicates one or more correspondence relationships between the first encryption algorithm and the second encryption algorithm in terms of an encryption strength; and a control unit operable to, when receiving the download request from the second terminal, (i) re-protect the confidential data by decrypting the confidential data with use of the first encryption algorithm and encrypting the decrypted confidential data with use of the second encryption algorithm, in accordance with the security policy table, and (ii) transmit the re-protected confidential data to the second terminal.

Effects of the Invention

With this structure, the present invention can prevent confidential data in a first terminal from mistakenly being migrated to an inappropriate terminal, because the data is migrated to a second terminal in accordance with a security policy in a migration system.

BRIEF DESCRIPTION OF THE DRAWINGS

FIG. 6 shows the structure of a Migration Package management table 601 in embodiment 1 of the present invention.

FIG. 7 shows the structure of an encryption strength table 701 in embodiment 1 of the present invention.

FIG. 8 shows the structure of an authentication level determination table 801 in embodiment 1 of the present invention.

FIG. 16 shows the structure of a content management table 1601 and a content management table 1602 in embodiment 2 of the present invention.

DESCRIPTION OF CHARACTERS

Figure 1:
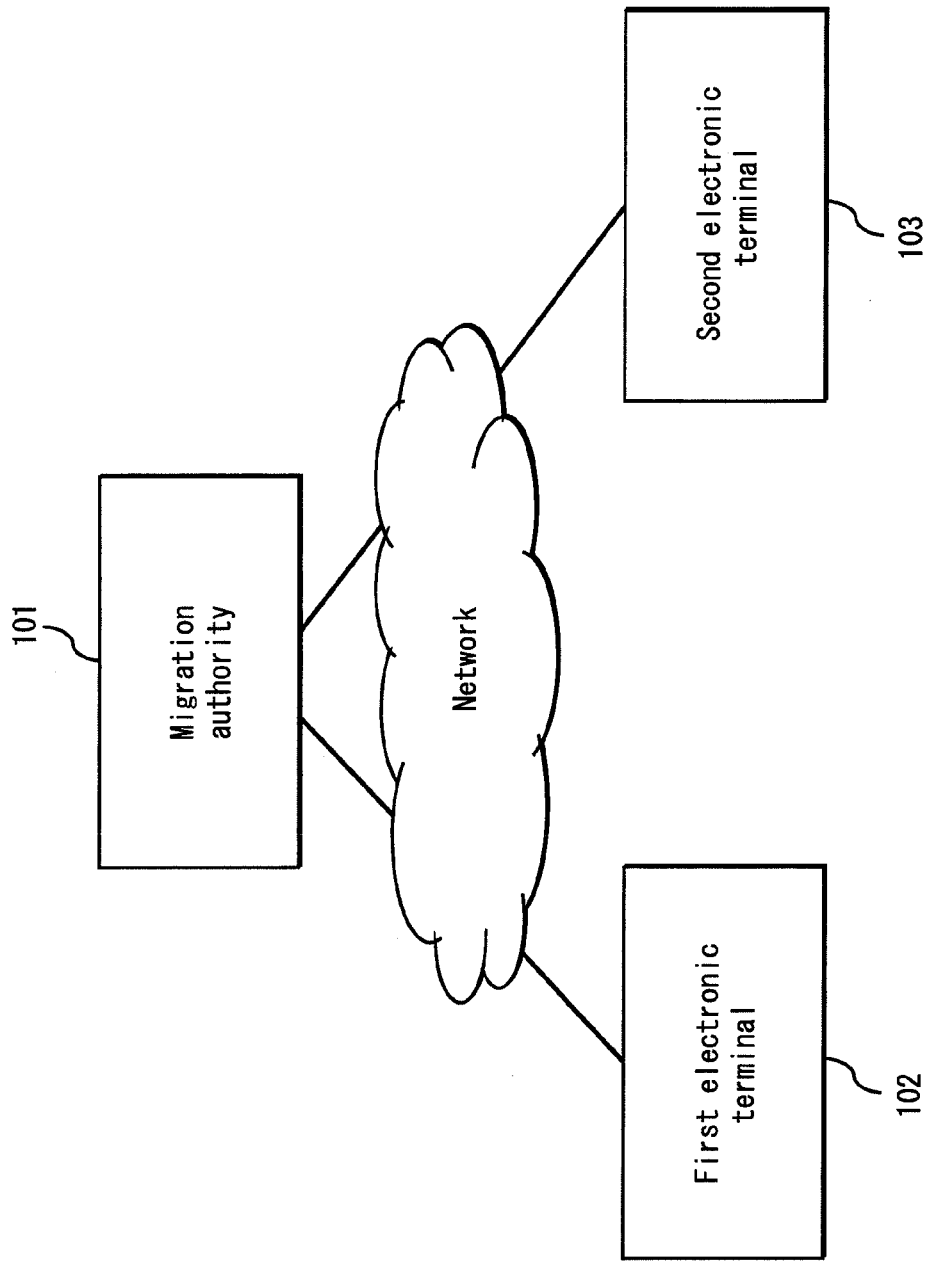
FIG. 1 shows the overall structure in embodiment 1 of the present invention.

101 Migration Authority
102 first electronic terminal
103 second electronic terminal
201 Trusted Platform Module
202 TCG Software Stack
203 Local Migration Services
204 Controlling Application
205 Local Application,
206 input/output unit
207 storage area
210 AIK credential
211 information management credential
212 Conformance credential
215 confidential data
500 data receiving unit
501 Attestation processing unit
502 credential analysis unit
503 Migration Package registration unit
504 Migrate availability determination unit
505 Migration Package regeneration unit
506 data transmission unit
507 storage area
601 Migration Package management table
701 encryption strength table
801 authentication level determination table
1201 encryption parameter
1301 regeneration example
1302 encryption parameter
1401 regeneration example
1402 encryption parameter.
1501 regeneration example
1502 encryption parameter
1601 content management table
1602 content management table
1701 right management table
1702 right protection key table
1703 time variable key
1704 right management table
1705 right protection key table
1706 time variable key
1801 migration key
1802 right protection key table for migration

BEST MODE FOR CARRYING OUT THE INVENTION

According to a first aspect of the invention a migration apparatus (for migrating confidential data protected in a first terminal to a second terminal) includes: a receiving unit operable to receive, from the first terminal, confidential data protected by a first encryption algorithm in a security module in the first terminal, and receive a download request for the confidential data from the second terminal; an identification unit operable to identify the first encryption algorithm by using a credential transmitted from the first terminal, and identify a second encryption algorithm used in a security module in the second terminal by using a credential transmitted from the second terminal; a holding unit holding a security policy table that indicates one or more correspondence relationships between the first encryption algorithm and the second encryption algorithm in terms of an encryption strength; and a control unit operable to, when receiving the download request from the second terminal, (i) re-protect the confidential data by decrypting the confidential data with use of the first encryption algorithm and encrypting the decrypted confidential data with use of the second encryption algorithm, in accordance with the security policy table, and (ii) transmit the re-protected confidential data to the second terminal.

In a second aspect of the invention, which is based on the first aspect of the invention, the correspondence relationships between the first encryption algorithm and the second encryption algorithm indicated by the security policy table includes correspondence relationship where an encryption strength level for the second encryption algorithm is lower than an encryption strength level for the first encryption algorithm.

With this structure, confidential data can be prevented from being migrated to a second terminal having a management method in which encryption strength level is lower than that specified in a security policy.

In a third aspect of the invention, which is based on the second aspect of the invention, the migration apparatus further includes a second security policy table storing a first security authentication level of the first terminal and a second security authentication level of the second terminal, wherein the control unit, even if there is the second encryption algorithm corresponding to the first encryption algorithm in accordance with the security policy table, prohibits the confidential data from being re-protected as long as a difference between the second security authentication level of the second terminal and the first security authentication level of the first terminal is equal to or higher than a predetermined value.

With this structure, confidential data can be prevented from being migrated to a second terminal having a management method in which security authentication level is lower than that specified in a security policy.

In a fourth aspect of the invention, which is based on the second aspect of the invention, the migration apparatus further includes a second security policy table storing a first security authentication level of the first terminal and a second security authentication level of the second terminal, wherein the control unit, even if there is the second encryption algorithm corresponding to the first encryption algorithm in accordance with the security policy table, re-protects the confidential data, and prohibits the re-protected confidential data from being transmitted to the second terminal as long as a difference between the second security authentication level of the second terminal and the first security authentication level of the first terminal is equal to or higher than a predetermined value.

With this structure, confidential data can be prevented from being migrated to a second terminal having a management method in which security authentication level is lower than that specified in a security policy even if the confidential data is re-protected by a second encryption algorithm.

In a fifth aspect of the invention, which is based on the second aspect of the invention, the encryption strength level for the first encryption algorithm is represented by a key length for the first encryption algorithm, and the encryption strength level for the second encryption algorithm is represented by a key length for the second encryption algorithm.

With this structure, confidential data can be prevented from being migrated to a second terminal having a management method in which encryption strength level is lower than that specified in a security policy.

In a sixth aspect of the invention, which is based on the first aspect of the invention, the identification unit identifies a type of the first encryption algorithm and a key length for the first encryption algorithm, and identifies a type of the second encryption algorithm, the holding unit holds the security policy table in which (i) the type of the first encryption algorithm and the key length for the first encryption algorithm and (ii) the type of the second encryption algorithm and a key length for the second encryption algorithm are indicated in correspondence with a same encryption strength level, and when re-protecting the confidential data, the control unit re-protects the confidential data by using the key length for the second encryption algorithm which corresponds to the key length for the first encryption algorithm.

In a seventh aspect of the invention, which is based on the first aspect of the invention, the identification unit identifies a type of the first encryption algorithm and a key length for the first encryption algorithm, and identifies a type of the second encryption algorithm, the holding unit holds the security policy table that indicates correspondence relationships among a plurality of encryption algorithms, in which a plurality of types of encryption algorithms and key lengths for the encryption algorithms are indicated in correspondence with a same encryption strength level, and when re-protecting the confidential data, the control unit searches the security policy table for the type of the second encryption algorithm and a key length for the second encryption algorithm indicated in correspondence with the same encryption strength level as the type of the first encryption algorithm and the key length therefore, and re-protects the confidential data by using the key length for the second encryption algorithm which corresponds to the key length for the first encryption algorithm.

With this structure, a key length used for re-protecting can be determined in an easy process by using a security policy table.

In an eighth aspect of the invention, which is based on the second aspect of the invention, the security policy table is transmitted from the first terminal to the migration apparatus.

With this structure, migration processing can be performed in accordance with a security policy specified by a first terminal.

In a ninth aspect of the invention, which is based on the second aspect of the invention, the receiving unit receives a master key, a piece of information that indicates an encryption algorithm using the master key, and a piece of information indicating a range of encryption/decryption using the master key, and the control unit protects only the data which is on a top of a tree structure of the confidential data by using the received master key and the encryption algorithm using the master key, based on the piece of information indicating the range of encryption/decryption using the master key.

In a tenth aspect of the invention, which is based on the second aspect of the invention, the receiving unit receives a master key and a piece of information that indicates an encryption algorithm using the master key, and the control unit generates a second key which is different from the received master key, and protects the confidential data by using the second key and the encryption algorithm using the master key.

In an eleventh aspect of the invention, which is based on the tenth aspect of the invention, the control unit generates the second key, which is different from the received master key, on a tier lower than a tier the master key located thereon.

With this structure, a second terminal can specify a desired encryption parameter, and request for migration of confidential data.

In a twelfth aspect of the invention, which is based on the second aspect of the invention, the receiving unit receives, from the second terminal, a public key and a piece of information that indicates an encryption algorithm using the public key, and the control unit protects the confidential data by using the received public key and the encryption algorithm using the public key.

In a thirteenth aspect of the invention, which is based on the second aspect of the invention, the receiving unit receives, from the second terminal, a private key and a piece of information that indicates an encryption algorithm using the private key, and the control unit protects the confidential data by using the received private key and the encryption algorithm using the private key.

In a fourteenth aspect of the invention, which is based on the second aspect of the invention, the receiving unit receives a master key from the second terminal, and the control unit protects all the confidential data at the same level as the encryption strength level indicated by the received master key.

In a fifteenth aspect of the invention, which is based on the second aspect of the invention, the receiving unit receives a piece of information indicating the encryption strength level from the second terminal, and the control unit protects the confidential data at the same level as the encryption strength level indicated by the received piece of information.

In a sixteenth aspect of the invention, which is based on the second aspect of the invention, the receiving unit receives, from the second terminal, a piece of information requesting for protecting confidential data at the same level as the encryption strength level when the first terminal protected the confidential data, and the control unit protects the confidential data at the same level as the encryption strength level when the first terminal protected the confidential data, based on the received piece of information.

With this structure, confidential data encrypted/decrypted in response to an encryption/decryption request from a second terminal can be migrated. For example, when the second terminal is provided with a latest encryption algorithm, the second terminal can get confidential data which supports the latest encryption algorithm.

In a seventeenth aspect of the invention, which is based on the second aspect of the invention, the migration apparatus further includes a migration server.

In an eighteenth aspect of the invention, which is based on the second aspect of the invention, the migration apparatus is included inside the first terminal.

With this structure, by a device having a server function and a first terminal working as a migration device, the above-stated migration function can be flexibly applied to an existing system.

In the following, embodiment 1 of the present invention will be described with reference to the attached drawings.

Embodiment 1

FIG. 1 shows the overall structure of the system in embodiment 1 of the present invention.

In FIG. 1, the Migration Authority 101 communicates with electronic terminals 102 and 103 via a network and provides a Migration service of confidential data.

A first electronic terminal 102 is a computer system comprised of components like CPU and RAM. Generally, it is realized by PC, mobile phone, and PDA, but not limited to them. The first electronic terminal 102 is provided with a secure platform mainly comprised of a security module called the Trusted Platform Module (TPM) formulated by the TCG. The TPM supports a technology called the Protected Storage for securely storing confidential data. With the Protected Storage, pieces of data are managed in a tree structure. The pieces of data assigned to leaves of the tree structure are protected by being hierarchically encrypted with use of keys assigned to nodes that exist on paths from a root to the leaves and a key assigned to the root. A key in the public key encryption (a root key) called an asymmetric SRK (Storage Root Key) is assigned to the root of the tree structure.

A second electronic terminal 103 is a computer system comprised of components like CPU and RAM. Generally, it is realized by PC, mobile phone, and PDA, but not limited to them. The second terminal 103 is provided with a secure platform mainly comprised of a security module called Trusted Platform Module (TPM) formulated by the TCG similarly to the first electronic terminal 102. The second electronic terminal 103 also supports the Protected Storage technology, and manages pieces of data in a tree structure similarly to the first electronic terminal 102. However, the root key is not a key in the public key encryption but a key in the private key encryption called a symmetric SRK.

The following describes details about a structure of the first electronic terminal 102 and the second electronic terminal 103.

Figure 2:
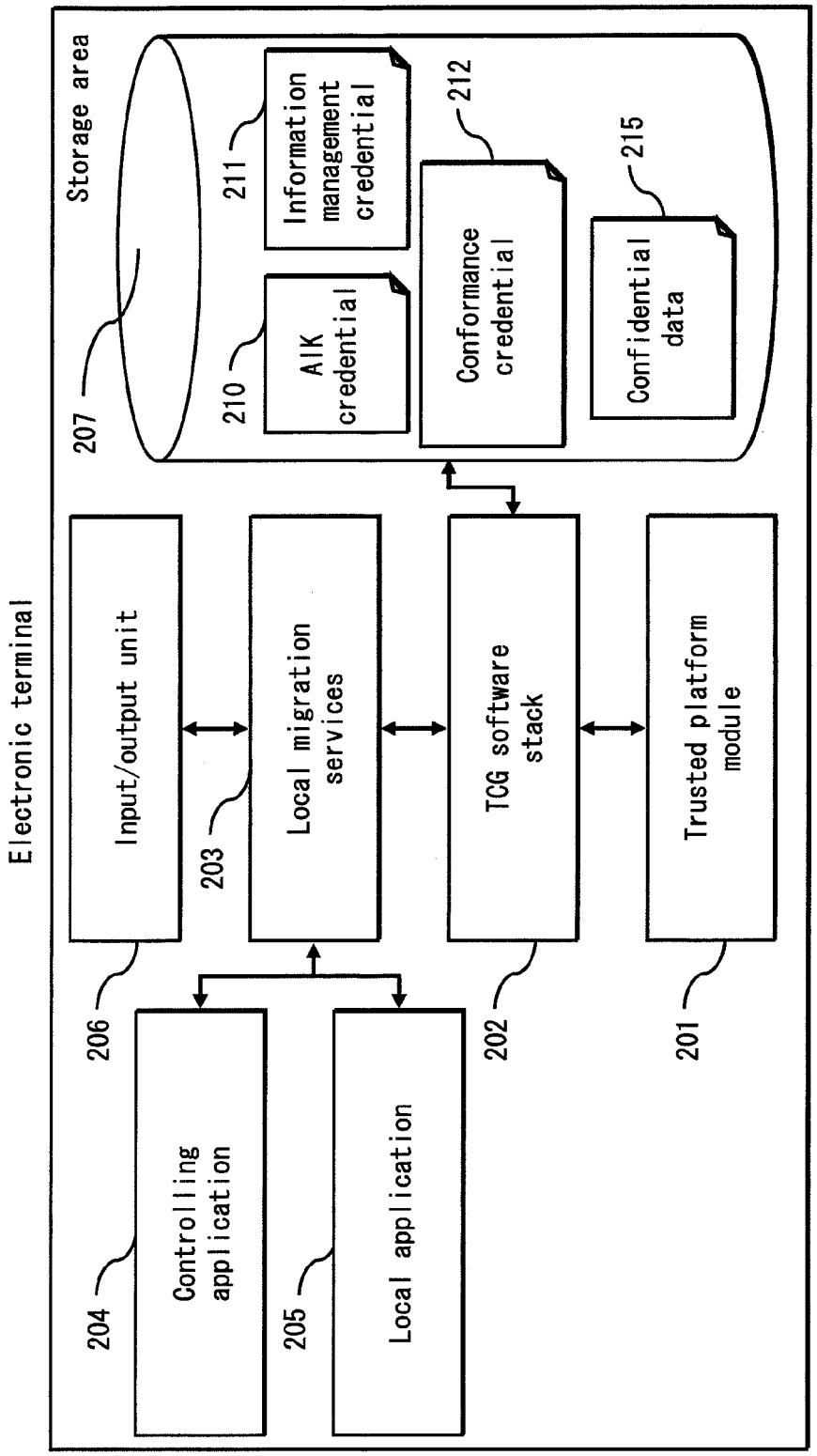
FIG. 2 shows the structure of the first electronic terminal in embodiment 1 of the present invention.

FIG. 2 shows the structure of the first electronic terminal 102 and the second electronic terminal 103.

A Trusted Platform Module 201 is a security module formulated by the TCG. It is provided with an encryption engine, a non-volatile memory and the like. The details thereabout are not described here because they are described in "TPM Main Part 1, 2, 3 Design Principles".

Although a security module which the first electronic terminal 102 and the second electronic terminal 103 are provided with is described here as the Trusted Platform Module (TPM), the equivalent security module is called a Mobile Trusted Module by the TCG Mobile Phone WG. Accordingly, a name of the security module is not limited to them. And, the implementation method is generally realized by hardware using semiconductor, it may be realized by software.

A TCG Software Stack 202 is a group of libraries of software for providing a variety of applications with services on a secure platform provided with the Trusted Platform Module 201. The details thereabout are not described here because they are described in "TCG Software Stack (TSS) Specification Version 1.2 Level 1 Errata A".

A Local Migration Services 203 is a client side module for realizing a Migration service of data. The details thereabout are not described here because they are described in the Non-Patent document 1.

A Controlling Application 204 is a client side module for controlling Migration processing in the client side. The details thereabout are not described here because they are described in the Non-Patent document 1.

A Local Application 205 is a general application using the Migration service of data. It is, for example, a Digital Rights Management (DRM) application managing a right to digital contents like music, video and the like, an address book application, a credit-card transaction application, but not limited to them.

An Input/Output unit 206 receives/transmits data from/to the Migration Authority 101.

A Storage area 207 stores an AIK credential 210 and an information management credential 211 and so on. Generally, it is realized by a HDD, a Flash memory and the like, but it is not limited to them if it has an information storing function.

The AIK credential 210 is called an Attestation Identity Key Credential. In this embodiment, it is described to be issued by the Migration Authority 101. The AIK credential 210 is used for confirming that TPM 201 has an AIK (Attestation Identity Key) and so on. The details thereabout are not described here because they are described in "TCG Specification Architecture Overview".

The information management credential 211 is used for confirming the management method of confidential data 215. In this embodiment, it is described to be issued by the Migration Authority 101. The details thereabout are not described here because they are described in "TCG Specification Architecture Overview".

A Conformance credential 212 is an attribute credential for proving that TPM 201 complies with a valuation standard of the TCG. Generally it is issued by an evaluation organization. In this embodiment, it is described to be issued by the Migration Authority 101.

Although the AIK credential 210, the information management credential 211, and the Conformance credential 212 here are described as different credentials, but they may comprise a single credential together.

The confidential data 215 is a group of confidential data managed by using a SRK (Storage Root Key). The AIK (Attestation Identity Key) is also included in the confidential data 215. The confidential data protected by the SRK formulated by the TCG is generally managed in a tree structure. The details thereabout are not described here because they are described in "TCG Specification Architecture Overview".

While the confidential data includes a key, it may also include a parameter showing a generation time and lifetime of the key.

The following describes the details about the information management credential 211.

Figure 3:
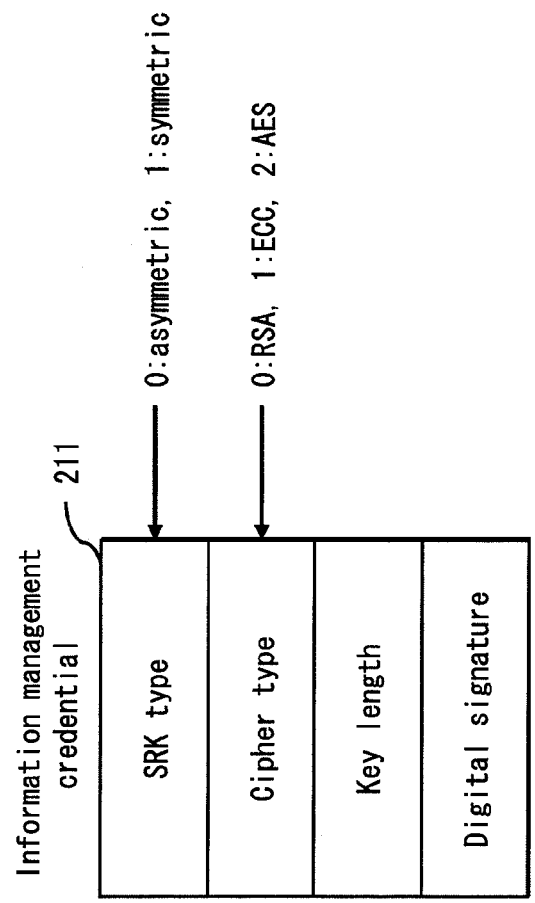
FIG. 3 shows the structure of an information management credential 211 in embodiment 1 of the present invention.

FIG. 3 shows the structure of the information management credential 211. The information management credential has a data structure including four pieces of data.

The first is a SRK Type. It is data of a data type showing whether confidential data is managed by a method using a public key encryption or a method using a private key encryption.

The second is a Cipher Type. It is data of a data type showing an encryption algorithm used in the management method of confidential data. Although the encryption algorithm is, for example, a RSA (Rivest Shamir Adleman) algorithm, an ECC (Elliptic Curve Cryptosystem) algorithm, and an AES (Advanced Encryption Standard) algorithm, but not limited to them.

The third is a Key Length. It is data of a data type showing a key length of an encryption key used in the management method of confidential data.

The forth is a digital signature. The digital signature contains data obtained by encrypting a digest value of the data types 1-3 (i.e. SRK Type, Cipher Type and Key Length) with use of a private key of the Migration Authority 101.

Meanwhile, the information management credential 211 may include data showing whether a key update function is included or not.

The following describes the details about the Conformance credential 212.

Figure 4:
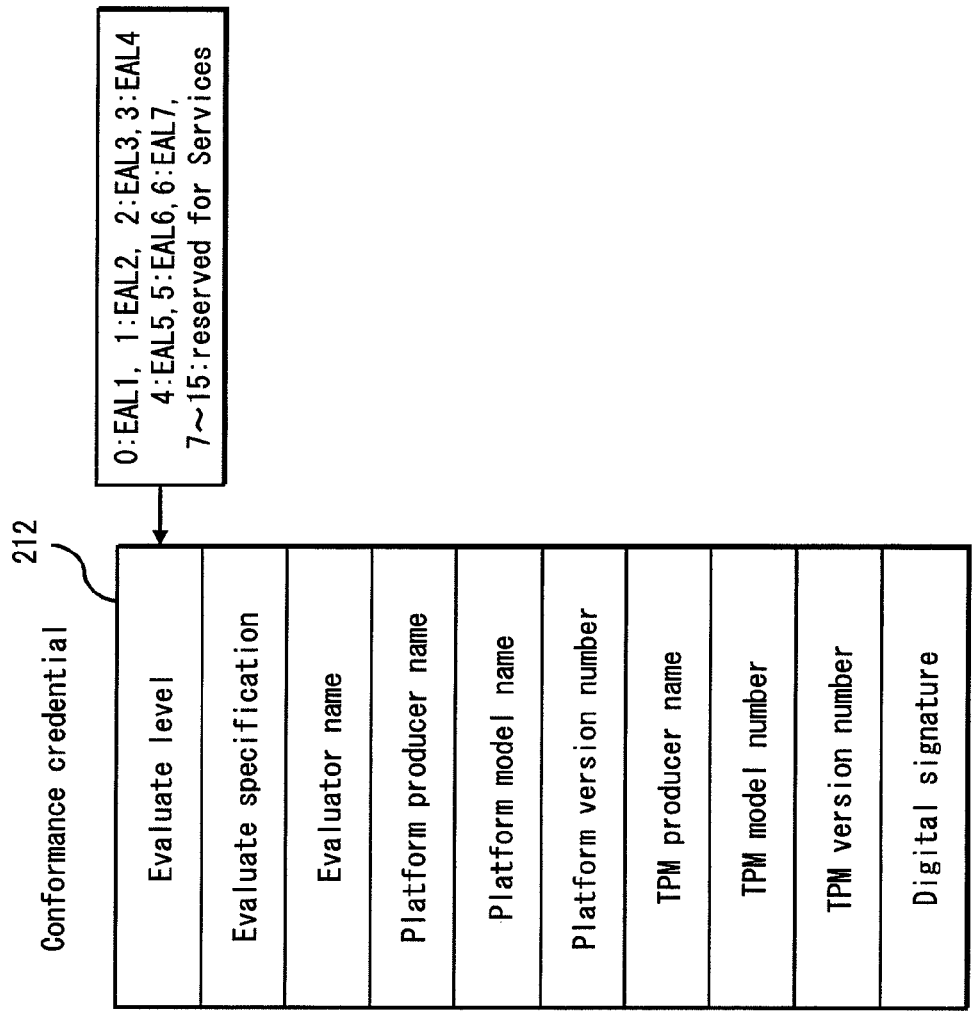
FIG. 4 shows the structure of a Conformance credential 212 in embodiment 1 of the present invention.

FIG. 4 shows the structure of the Conformance credential 212. The Conformance credential 212 has a data structure including nine pieces of data.

The first is data indicating an Evaluate level. It is represented by a level authorized in accordance with a security evaluation standard set by ISO/IEC15408. EAL is an abbreviation form of Evaluation Assurance Level. The bigger the number attached thereto, the higher level guarantee requirements can be met. Also, as a level like "EAL 4+" has been formulated, the data which was added in response to changes to the times may be added as data treated in the area. And also the area is not only used for a level authorized in accordance with ISO/IEC15408 but also used for a level arbitrarily determined and used by, for example, a communication carrier operating as the Migration Authority 101.

The second is data for specifying a specification of a security evaluation standard used for authorizing the Evaluate level. ISO/IEC15408 includes a plurality of specifications like ISO/IEC15408:1999 formulated in 1999 and ISO/IEC15408:2005 formulated in 2005. The specification targeted for the evaluation standard is specified with reference to this area.

The third data and onwards are not described here because they are described in "TCG Specification Architecture Overview".

The following describes the details of the Migration Authority 101.

Figure 5:
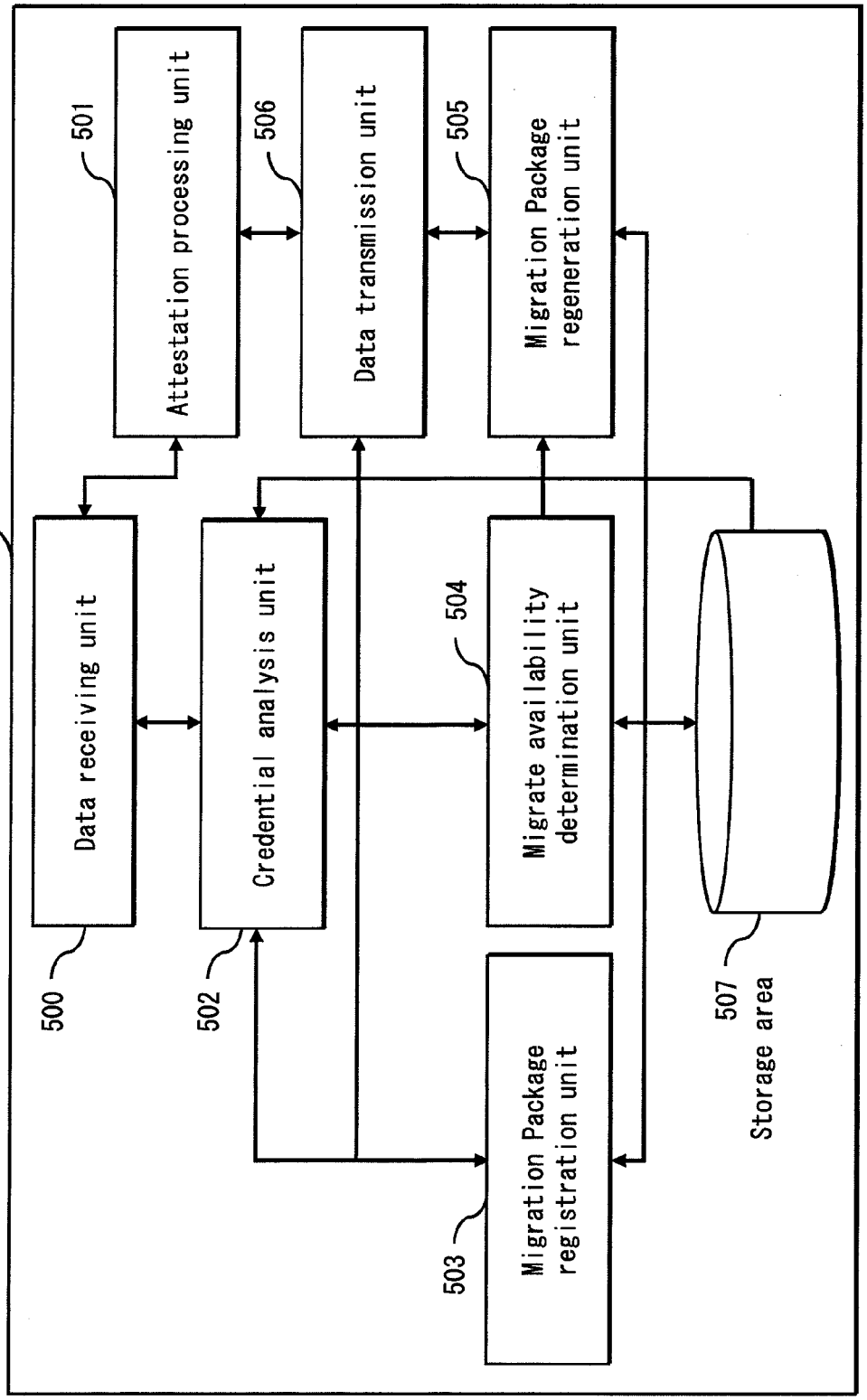
FIG. 5 shows the structure of a Migration Authority 101 in embodiment 1 of the present invention.

FIG. 5 shows the structure of the Migration Authority 101.

A data receiving unit 500 receives an upload request and a download request for Migration Package transmitted from the first terminal 102 and the second terminal 103, and pieces of data required for various processing.

An Attestation processing unit 501 performs Attestation processing when the Migration Authority 101 is accessed by an electronic terminal. If the electronic terminal is invalid terminal, the invalid terminal can be detected by the Attestation processing. The details about the Attestation processing are not described here because they are described in "TCG Specification Architecture Overview". The result of the Attestation processing is transmitted to the electronic terminal via a data transmission unit 506.

A credential analysis unit 502 analyzes whether a credential transmitted from electronic terminals which operate as a Migrate source or a Migrate destination is valid one or not. It is described to be provided with a RSA encryption computing function, a pair of a public key and a private key used for executing the RSA encryption computing function, and a SHA (Secure Hash Algorithm) 1 computing function.

To verify the validity of a credential, verification method using a public key encryption set by Public Key Infrastructure (PKI) is employed by the credential analysis unit 502 here. Verification using the PKI is popular, so a further description thereof is omitted. Here, the method is not limited to this as long as it is the method by which a validity of a credential can be verified. Although the credential may be issued by something except the Migration Authority 101 depending on a type of the credential, all credentials in this embodiment are described to be issued by the Migration Authority 101. The case where the credentials are issued by entities other than the Migration Authority 101 is not described here.

The result of the credential analysis is transmitted to the electronic terminal via the data transmission unit 506.

A Migration Package registration unit 503 stores, in a storage area 507, Migration Package having stored therein pieces of confidential data transmitted from the first electronic terminal 102 and the second electronic terminal 103, and registers data relating to the Migration Package with a Migration Package management table 601 (described later).

A Migrate availability determination unit 504 determines availability of Migration with reference to a Migration Package ID (described later), an encrypted master key (described later), encryption parameter 1201 (described later), the Conformance credential 212, and the information management credential 211 in response to a Migration Package transmission request transmitted from the first electronic terminal 102 and the second electronic terminal 103. For the determination, an encryption strength table 701 (described later), an authentication level determination table 801 (described later), and a Migration Package management table 601 (described later) are used. When the result of the determination is affirmative, a Migration Package regeneration request is issued to a Migration Package regeneration unit 505.

Although the Migrate availability determination unit 504 makes the determination based on the Migration Package management table 601 here, it may makes the determination by directly accessing information included in the credential.

Upon receiving the Migration Package ID, the encrypted master key, the encryption parameter, the Conformance credential 212, and the information management credential 211 as well as the Migration Package regeneration request from the Migrate availability determination unit 504, the Migration Package regeneration unit 505 encrypts/decrypts a Migration Package to regenerate. The details about the regeneration process will be described later. The regenerated Migration Package is transmitted to the data transmission unit 506.

Upon receiving the Migration Package from the Migrate availability determination unit 504, the data transmission unit 506 retrieves the Migration Package from the storage area 507, and transmits it to the first electronic terminal 102 and the second electronic terminal 103.

The following describes the details about the Migration Package management table 601.

FIG. 6 shows the structure of the Migration Package management table 601. The table 601 includes pieces of data such as Migration Package ID identifying the Migration Package in the Migration Authority 101, a file name which is indicated by a full path of the storage area 507 having stored therein the Migration Package. Here, other parameters are identical to those included in the information management credential 211 and the Evaluate level included in the Conformance credential 212, so the further explanation thereabout is omitted.

The following describes the details about the encryption strength table 701.

FIG. 7 shows the structure of the encryption strength table 701. The table 701 is comprised of parameters like a strength level, a key length for a private key encryption algorithm, a key length for a RSA algorithm, and a key length for an ECC algorithm. In FIG. 7, for example, in order to satisfy the strength level 1, a key length of 80 bits for the private key encryption algorithm, a key length of 1024 bits for the RSA algorithm, and a key length of 160 bits for the ECC algorithm are required.

Regarding the encryption strength table 701, it is presumed here that vulnerability has not discovered in the encryption algorithm yet. Because a further key length is required when the vulnerability is discovered in the encryption algorithm, the encryption strength table 701 changes with time. Therefore, it may be something arbitrarily updated by a third party like a certificate authority. By updating, it becomes possible to evaluate the latest encryption strength and respond to the latest encryption algorithm.

The Migrate availability determination unit 504 makes a determination with use of the encryption strength table 701 in accordance with a determination algorithm. In the algorithm, Migration is allowed only when the strength level of a Migrate destination is equal to or higher than the strength level of a Migrate source. It is to prevent the strength level from being reduced by the Migration.

Meanwhile, the determination algorithm is not limited to the above example and it may be an algorithm in which Migration is allowed when the strength level of a Migrate destination is equal to or higher than the strength level which is one level lower than the strength level of a Migrate source, or when the strength level of a Migrate destination is higher than the strength level of a Migrate source.

Also, the determination algorithm used by the Migrate availability determination unit 504 may be designated by the Migrate source. And further, the Migrate source may transmit the encryption strength table 701 and the authentication level determination table 801 to be used for the determination, designating them.

The following describes the details about the authentication level determination table 801.

FIG. 8 shows the structure of the authentication level determination table 801. The table is comprised of parameters like a Migrate source authentication level and a Migrate destination authentication level. The authentication level determination table 801 indicates that any Migrate destination authentication levels can be allowed when the Migrate source authentication level is EAL 1. The Migrate destination authentication level EAL 1 or higher is required when the Migrate source authentication level is EAL 2, the Migrate destination authentication level EAL 2 or higher is required when the Migrate source authentication level is EAL 3, the Migrate destination authentication level EAL 3 or higher is required when the Migrate source authentication level is EAL 4. And the equivalent Migrate destination authentication level is required when the Migrate source authentication level is EAL 5 or higher. Any Migrate destination authentication levels can be allowed when the Migrate source authentication level is not included in EAL 1 to EAL 7.

Although it is described here that the Migrate destination authentication level can be one level lower than the Migrate source authentication level when the Migrate source authentication level is EAL 2 to EAL 4, it may be defined that the level should be equivalent to or higher than the Migrate source authentication level.

The following describes an operation when uploading confidential data in this embodiment.

Figure 9:
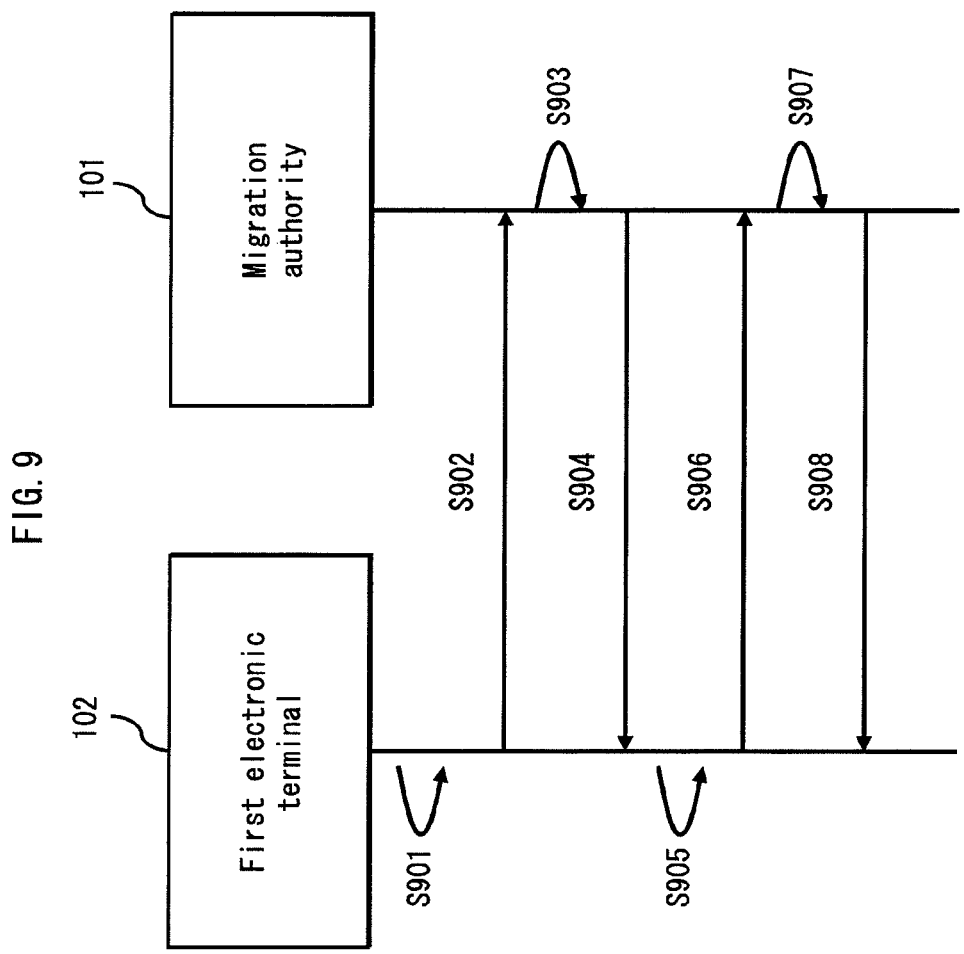
FIG. 9 is a flowchart showing a process operated by the first electronic terminal 102 of uploading confidential data to the Migration Authority 101 in embodiment 1 of the present invention.

FIG. 9 shows a process operated by the first electronic terminal 102 of updating confidential data to the Migration Authority 101. The operation steps are explained as follows.

(S901) The first electric terminal 102 prepares for uploading of confidential data. It aggregates one or more pieces of confidential data targeted for the uploading and generates a package of data called Migration Package. The details about the Migration Package are not described here because they are described in the Non-Patent document 1.

Then, the first electronic terminal 102 retrieves a digest value calculated for all or any of software including the first electronic terminal 102 like a boot loader, an OS, a device driver, and an application from a register called Platform Configuration Registers (PCR) in the Trusted Platform Module 201 with use of a function called Integrity Measurement formulated by the TCG. And it digitally signs, in the Trusted Platform Module 201, the digest value using the AIK included in the confidential data 215.

The details about the Integrity Measurement are not described here because they are described in "TCG Specification Architecture Overview".

(S902) The first electronic terminal 102 requests the Migration Authority 101 for uploading the Migration Package. The first electronic terminal 102 sends the digest value, the digital signature, the AIK credential 210 as well as the request to the Migration Authority 101.

The sending of the digest value and the digital signature is called Integrity Reporting. The details about the Integrity Reporting are not described here because they are described in "TOG Specification Architecture Overview".

(S903) The Migration Authority 101 receives the upload request for the Migration Package from the first electronic terminal 102. The data receiving unit 500 sends the digest value, the digital signature, and the AIK credential which were received at the same time to the Attestation processing unit 501. The Attestation processing unit 501 verifies whether or not the first electronic terminal 102 is an invalid terminal by performing an Attestation processing. The invalid terminal is a terminal which has been fabricated by a malicious user or a virus to cause unexpected operation.

(S904) The Migration Authority 101 operates as follows depending on the result of (S903).

(i) When the Migration Authority 101 verifies that the first electronic terminal is a valid terminal, it sends an Attestation result "OK" and a public key of the Migration Authority 101 (MA pub Key) to the first electronic terminal 102.

(ii) When the Migration Authority 101 verifies that the first electronic terminal is an invalid terminal, it sends an Attestation result "NG" to the first electronic terminal 102.

(S905) The first electronic terminal 102 operates as follows depending on the information received from the Migration Authority 101.

(i) When the first electronic terminal 102 receives the result "OK" from the Migration Authority 101, it encrypts the Migration Package generated in (S901) using the MA pub Key which was received at the same time.

(ii) When the first electronic terminal 102 receives the result "NG" from the Migration Authority 101, it ends operation.

Although the Migration Package is encrypted by using the MA pub Key in order to be securely treated here, the method is not limited to this as long as it is a method for securely treating the Migration Package. For example, after the first electronic terminal 102 and the Migration Authority 101 authenticate mutually, they share a shared key called a session key to be used temporally. Then the Migration Package may be encrypted by the session key.

(S906) The first electronic terminal 102 sends the Migration Package encrypted in (S905), the Conformance credential 212, and the information management credential 211 to the Migration Authority 101.

Although the Migration Package, the Conformance credential 212, and the information management credential 211 are treated as different data here, each credential may be included in the Migration Package.

(S907) The Migration Authority 101 receives the Migration Package, the Conformance credential 212, and the information management credential 211. Upon receiving these pieces of data, the data receiving unit 500 sends them to the credential analysis unit 502.

The credential analysis unit 502 verifies a validity of these credentials and operates as follows depending on the result of the verification.

(i) When the credential analysis unit 502 verifies that these credentials are valid credentials, it sends them to the Migration Package registration unit 503.

(ii) When the credential analysis unit 502 verifies that some of these credentials are invalid credentials, it sends a result "NG" to the first electronic terminal 102 through the data transmission unit 506.

Upon receiving the Migration Package, the Conformance credential 212, and the information management credential 211 from the credential analysis unit 502, the Migration Package registration unit 503 generates the Migration Package ID for uniquely identifying the Migration Package in the Migration Authority 101, and stores the Migration Package into the storage area 507. Also, it extracts pieces of data from the storage destination and each credential and registers them to the Migration Package management table.

(S908) After completing the registration processing of (S907), the Migration Authority 101 sends a result "OK" and the Migration Package ID to the first electronic terminal 102 through the data transmission unit 506.

The following describes a download processing of confidential data in this embodiment.

Figure 10:
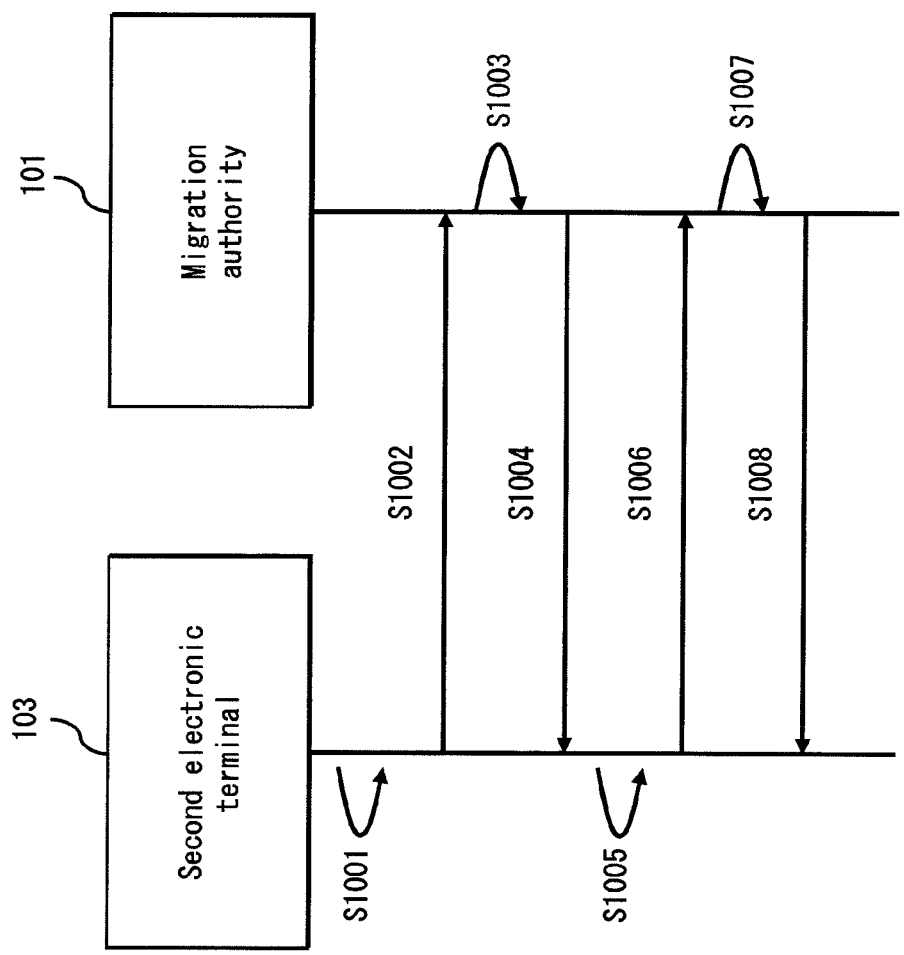
FIG. 10 is a flowchart showing a process operated by the second electronic terminal 103 of downloading confidential data from the Migration Authority 101 in embodiment 1 of the present invention.

FIG. 10 shows a process operated by the second electronic terminal 103 of downloading confidential data from the Migration Authority 101. The operation steps are explained as follows.

(S1001) The second electric terminal 103 prepares for downloading of the Migration Package. The second electronic terminal 103 retrieves a digest value calculated for all or any of software including the second electronic terminal 103 like a boot loader, an OS, a device driver, and an application from a register called Platform Configuration Registers (PCR) in the Trusted Platform Module 201 with use of a function called Integrity Measurement formulated by the TCG. And it digitally signs, in the Trusted Platform Module 201, the digest value using the AIK included in the confidential data 215.

(S1002) The second electronic terminal 103 requests the Migration Authority 101 for downloading the Migration Package (a download request). The second electronic terminal 103 sends the digest value, the digital signature, the AIK credential 210 as well as the request to the Migration Authority 101.

(S1003) The Migration Authority 101 receives the download request for the Migration Package from the second electronic terminal 103. It sends the digest value, the digital signature, and the AIK credential 210 which were received at the same time to the Attestation processing unit 501. The Attestation processing unit 501 verifies whether or not the second electronic terminal 103 is an invalid terminal by performing an Attestation processing.

(S1004) The Migration Authority 101 operates as follows depending on the result of (S1003).

(i) When the Migration Authority 101 verifies that the second electronic terminal 103 is a valid terminal, it sends an Attestation result "OK" and a public key of the Migration Authority 101 (MA pub Key) to the second electronic terminal 103.

(ii) When the Migration Authority 101 verifies that the second electronic terminal 103 is an invalid terminal, it sends an Attestation result "NG" to the second electronic terminal 103.

(S1005) The second electronic terminal 103 operates as follows depending on the information received from the Migration Authority 101.

(i) When the second electronic terminal 103 received the result "OK" from the Migration Authority 101, it downloads the Migration Package and encrypts a master key using the MA pub Key which was received at the same time as the reception of the Attestation result. The master key is a key for encrypting the confidential data which is on the top of a tree structure when expanding the Migration Package.

(ii) When the second electronic terminal 103 received the result "NG" from the Migration Authority 101, it ends operation.

Although the Migration Package is encrypted by using the MA pub Key in order to be securely treated here, the method is not limited to this as long as it is a method for securely treating the Migration Package. For example, after the second electronic terminal 103 and the Migration Authority 101 authenticate mutually, they share a shared key called a session key to be used temporally. Then the Migration Package may be encrypted by the session key.

(S1006) The second electronic terminal 103 sends the Migration Package ID of the Migration Package which it desires to download, the master key encrypted in (S1005), the encryption parameter to be used when regenerating the Migration Package, the Conformance credential 212, and the information management credential 211 to the Migration Authority 101.

(S1007) The Migration Authority 101 receives the Migration Package ID, the encrypted master key, the encryption parameter, the Conformance credential 212, and the information management credential 211. Upon receiving these pieces of data, the data receiving unit 500 sends them to the credential analysis unit 502.

The credential analysis unit 502 verifies a validity of these credentials and operates as follows depending on the result of the verification.

(i) When the credential analysis unit 502 verifies that these credentials are valid credentials, it sends the Migration Package ID, the encrypted master key, the encryption parameter, the Conformance credential 212, and the information management credential 211 to the Migrate availability determination unit 504.

(ii) When the credential analysis unit 502 verifies that some of these credentials are invalid credentials, it sends a result "NG" through the data transmission unit 506.

The Migrate availability determination unit 504 receives the Migration Package ID, the encrypted master key, the encryption parameter, the Conformance credential 212, and the information management credential 211 from the credential analysis unit 502. The determination operation of the Migrate availability determination unit 504 is described later with use of FIG. 11. The Migrate availability determination unit 504 operates as follows depending on the result of the determination.

(i) If the determination is affirmative "OK", it sends the Migration Package regeneration request as well as the Migration Package ID, the encrypted master key, the encryption parameter, the Conformance credential 212, and the information management credential 211 to the Migration Package regeneration unit 505.

(ii) If the determination is negative "NG", it sends a result "NG" to the second electronic terminal 103 through the data transmission unit 506.

Upon receiving the Migration Package ID, the encrypted master key, the encryption parameter, the Conformance credential 212, and the information management credential 211 as well as the Migration Package regeneration request, the Migration Package regeneration unit 505 regenerates the Migration Package identified by the Migration Package ID. The regeneration operation is described later with use of FIG. 13.

(S1008) After completing the operation of (S1007), the Migration Authority 101 sends a result "OK" and the Migration Package to the second electronic terminal 103 through the data transmission unit 506.

Meanwhile, the second electronic terminal 103 may receive the Migration Package, decrypt it in the Trusted Platform Module 201, and verify whether or not the Migration Package is valid data by using credentials. In this case, when the Migration Package is verified as invalid data, it may request a retransmission of the Migration Package to the Migration Authority 101.

The following describes an operation when determining the Migrate availability of confidential data in this embodiment.

Figure 11:
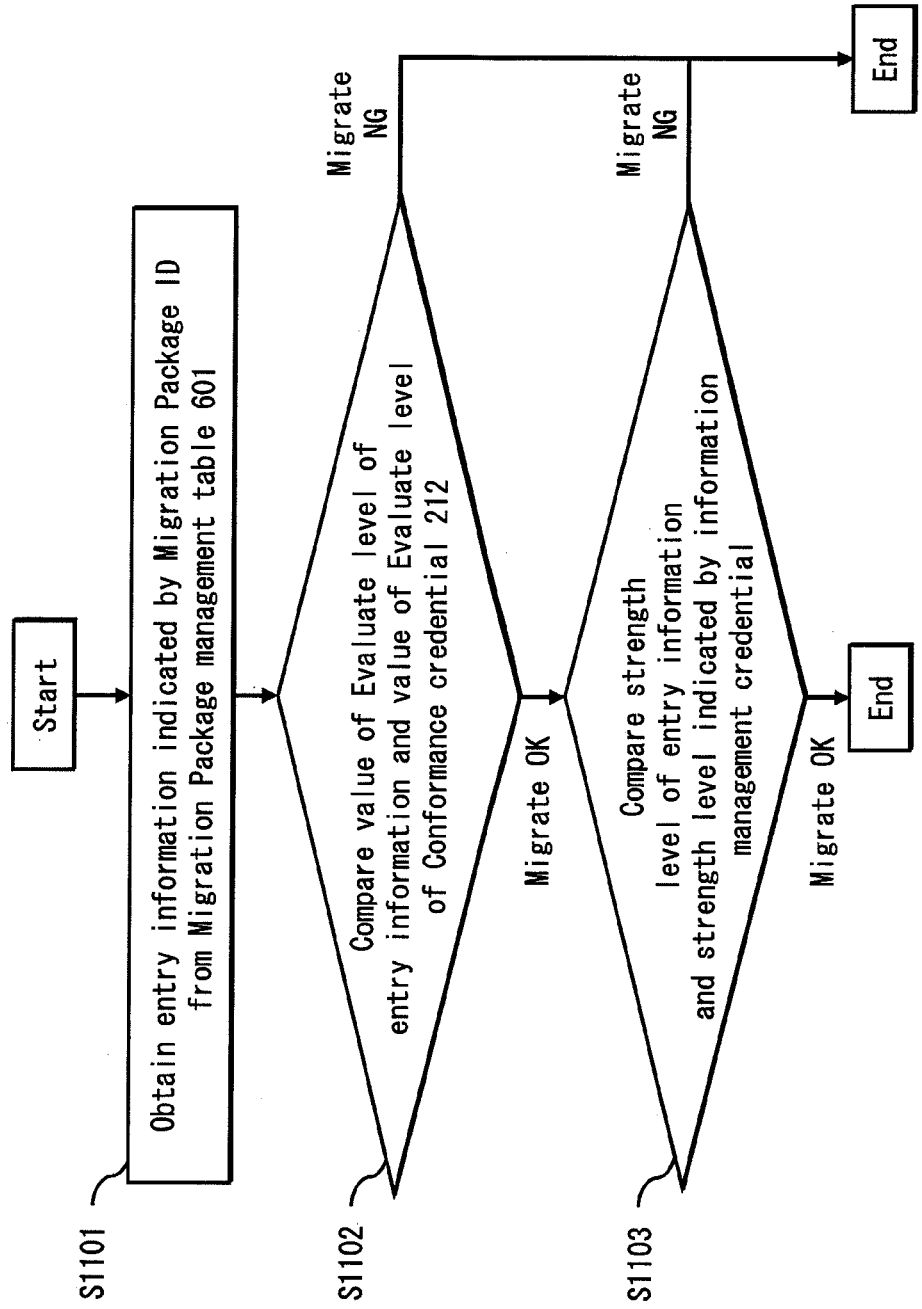
FIG. 11 is a flowchart showing a process operated by a Migrate availability determination unit 504 in the Migration Authority 101 of determining Migrate availability in embodiment 1 of the present invention.

FIG. 11 shows a process operated by the Migrate availability determination unit 504 in the Migration Authority 101.

In this embodiment, it is presumed that a Migration ID is specified as 001, an Evaluate level of the Conformance credential 212 is specified as EAL 4, a SRK Type of the information management credential 211 is specified as symmetric, a Cipher Type thereof is specified as AES, and a Key Length therefor is specified as 128.

(S1101) The Migrate availability determination unit 504 obtains entry information indicated by the received Migration ID 001 from the Migration Package management table 601.

(S1102) The Migrate availability determination unit 504 makes a comparison and a determination of the Evaluation level at first. The authentication level determination table 801 is used in the determination.

In this embodiment, an Evaluate level of the Conformance credential 212 is specified as EAL 4. The Evaluate level specified by the Migration ID 001 is EAL 4, thus both authentication levels are identical. According to the authentication level determination table 801, Migration is possible when the authentication level is equal to or higher than EAL 3, so the determination is affirmative.

(S1103) The Migrate availability determination unit 504 makes a comparison and a determination of the encryption strength.

In this embodiment, a SRK Type of the information management credential 211 is specified as symmetric, a Cipher Type thereof is specified as AES, and a Key Length is specified as 128. The SRK Type specified by the Migration ID 001 is asymmetric, the Cipher Type is RSA, the Key Length is 2048. Here, the both SRK Types and Cipher Types are different, so it is not possible to determine the encryption strength by only comparing both Key Lengths. Accordingly, the encryption strength table 701 is used to determine the encryption strength.

According to the encryption strength table 701, the encryption strength level specified by the Migration ID 001 is the strength level 2. On the other hand, according to the encryption strength table 701, the encryption strength level specified by the information management credential 211 is the strength level 3. In the determination algorithm used by the Migrate availability determination unit 504, Migration is allowed when the strength level of the Migrate destination is equal to or higher than the strength level of the Migrate source, so the determination of the encryption strength is affirmative.

The following describes the details about the structure of the encryption parameter 1201.

Figure 12:
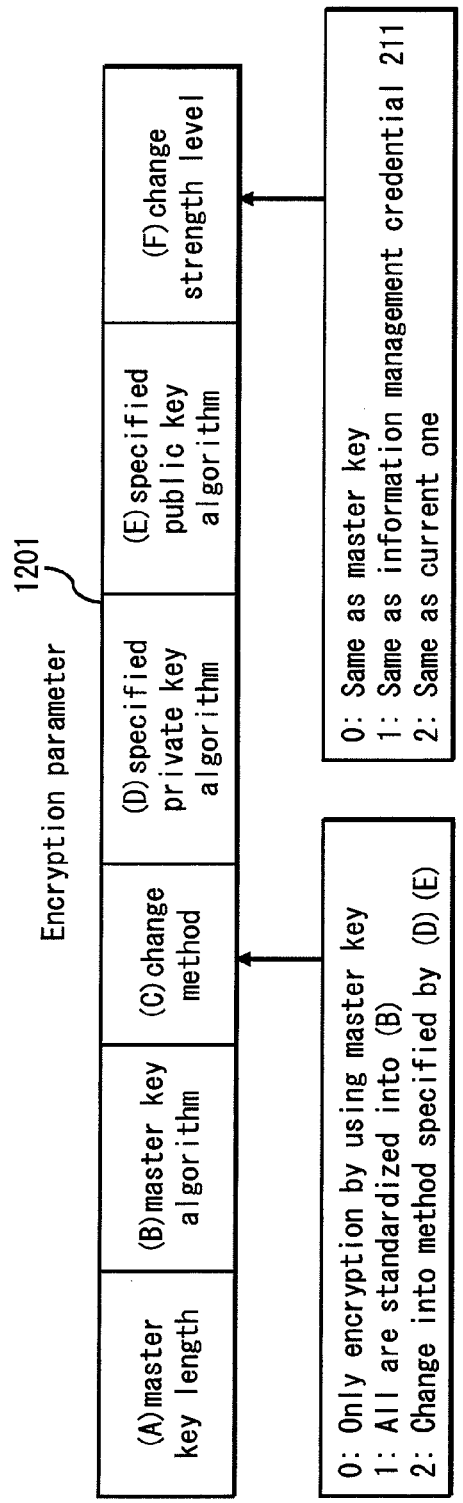
FIG. 12 shows the structure of an encryption parameter 1201 transmitted by the second electronic terminal 103 when the second electronic terminal 103 desires to download a Migration Package in embodiment 1 of the present invention.

FIG. 12 shows the structure of the encryption parameter 1201 transmitted by an electronic terminal when it desires to download the Migration Package. The encryption parameter 1201 has a data structure including six pieces of data.

The first is (A) a master key Length. It is a piece of data showing a key length of the master key transmitted in (S1006).

The second is (B) a master key algorithm. It is a piece of data showing an encryption algorithm when using the master key transmitted in (S1006). RSA, ECC, AES and the like are specified as it.

The third is (C) a change method. It is a piece of data showing how the Migration Package regeneration unit 505 regenerates the Migration Package. The following three parameters can be specified as it.

(1) Parameter 0: only the pieces of data which locate on the tier immediately under the master key are encrypted with use of the master key.

(2) Parameter 1: all the encryption algorithms of confidential data included in the Migration Package are standardized into the algorithm specified by the master key algorithm.

(3) Parameter 2: from among encryption algorithms of confidential data included in the Migration Package, the algorithm of the private key encryption system is changed into the algorithm specified by (D) a specified private key algorithm, or the algorithm of the public key encryption system is changed into the algorithm specified by (E) a specified public key algorithm.

The fourth is (D) the specified private key algorithm. Information for specifying a private key algorithm is described here. The specified private key algorithm is referenced when the parameter 2 is specified in (C) the change method. A private key algorithm of confidential data is changed to the private key algorithm described here.

The fifth is (E) the specified public key algorithm. Information for specifying a public key algorithm is described here. The specified public key algorithm is referenced when the parameter 2 is specified in (C) the change method. A public key algorithm of confidential data is changed to the public key algorithm described here.

The sixth is (F) a change strength level. It is referenced when the parameter 1 or 2 is specified in (C) the change method. The following three parameters can be specified as it.

(1) Parameter 0: the Migration Package is regenerated at the same strength level as the strength level of the master key.

(2) Parameter 1: the Migration Package is regenerated at the same strength level as the strength level of the information management credential 211.

(3) Parameter 2: the Migration Package is regenerated at the same strength level as the strength level of the current Migration Package.

The following describes a regeneration operation when a certain encryption parameter 1201 is given to the Migration Package regeneration unit 505.

Figure 13:
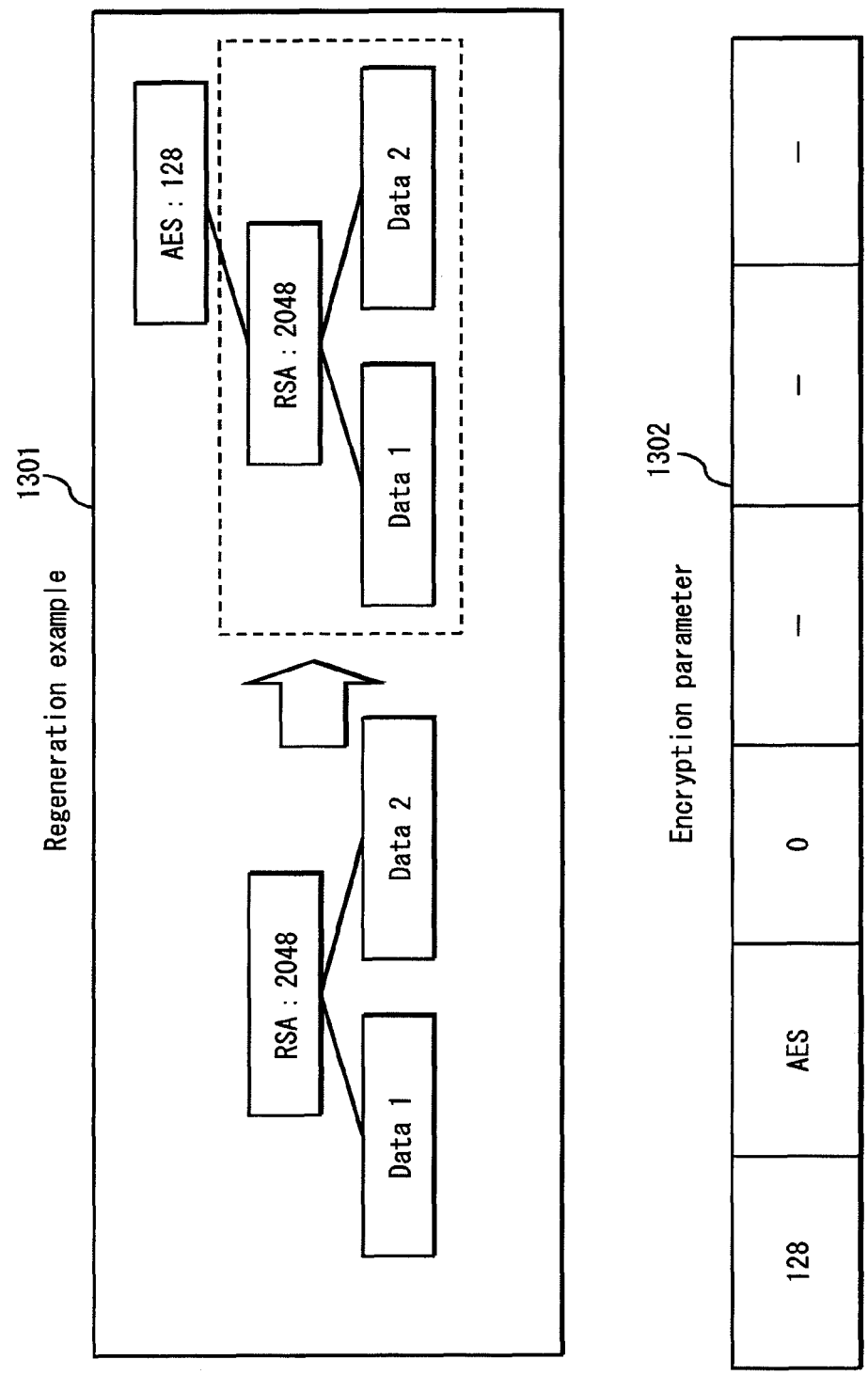
FIG. 13 shows the Migration Package to be regenerated when an encryption parameter 1302 is given thereto in embodiment 1 of the present invention.
Figure 14:
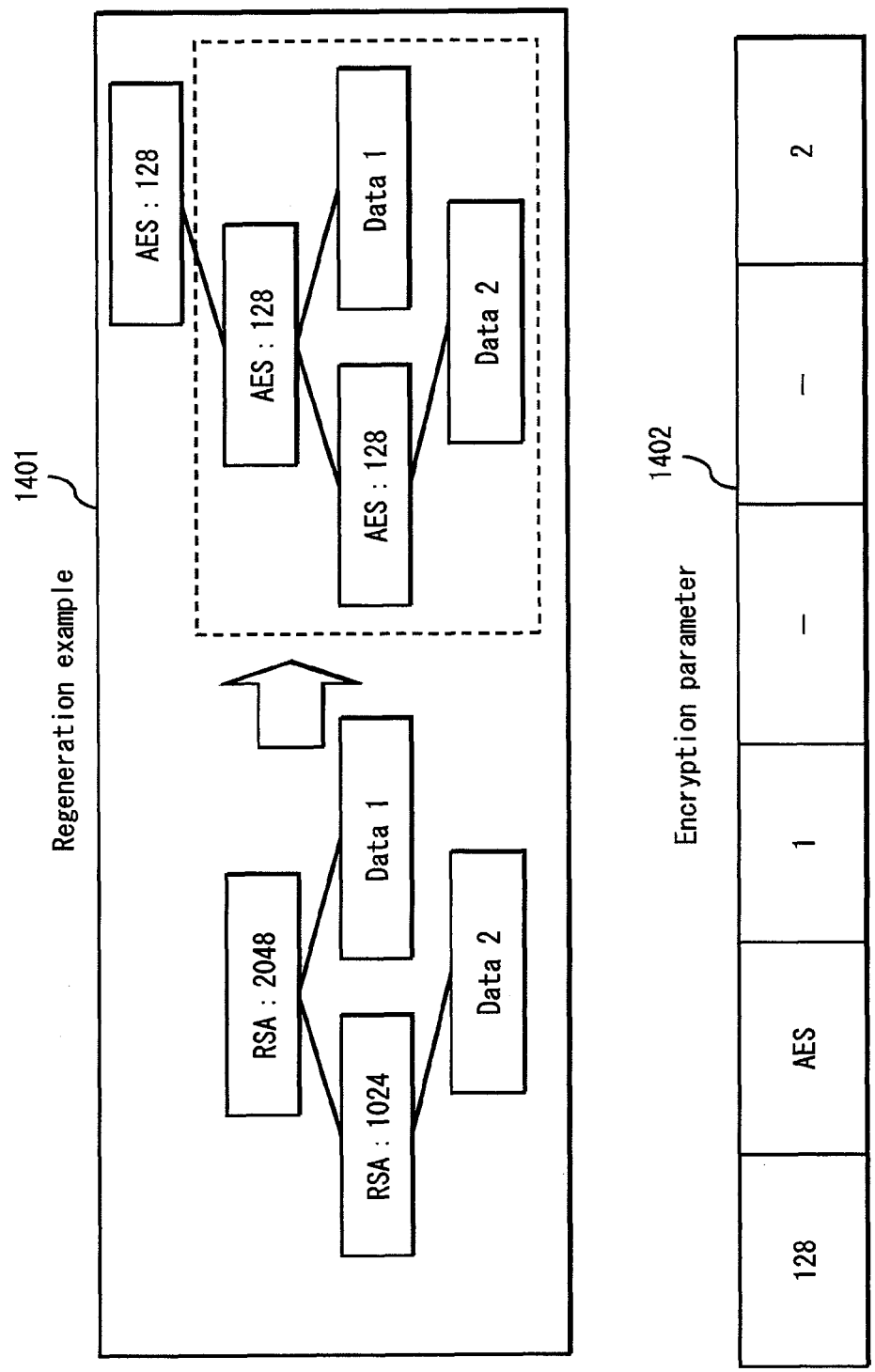
FIG. 14 shows the Migration Package to be regenerated when an encryption parameter 1402 is given thereto in embodiment 1 of the present invention.
Figure 15:
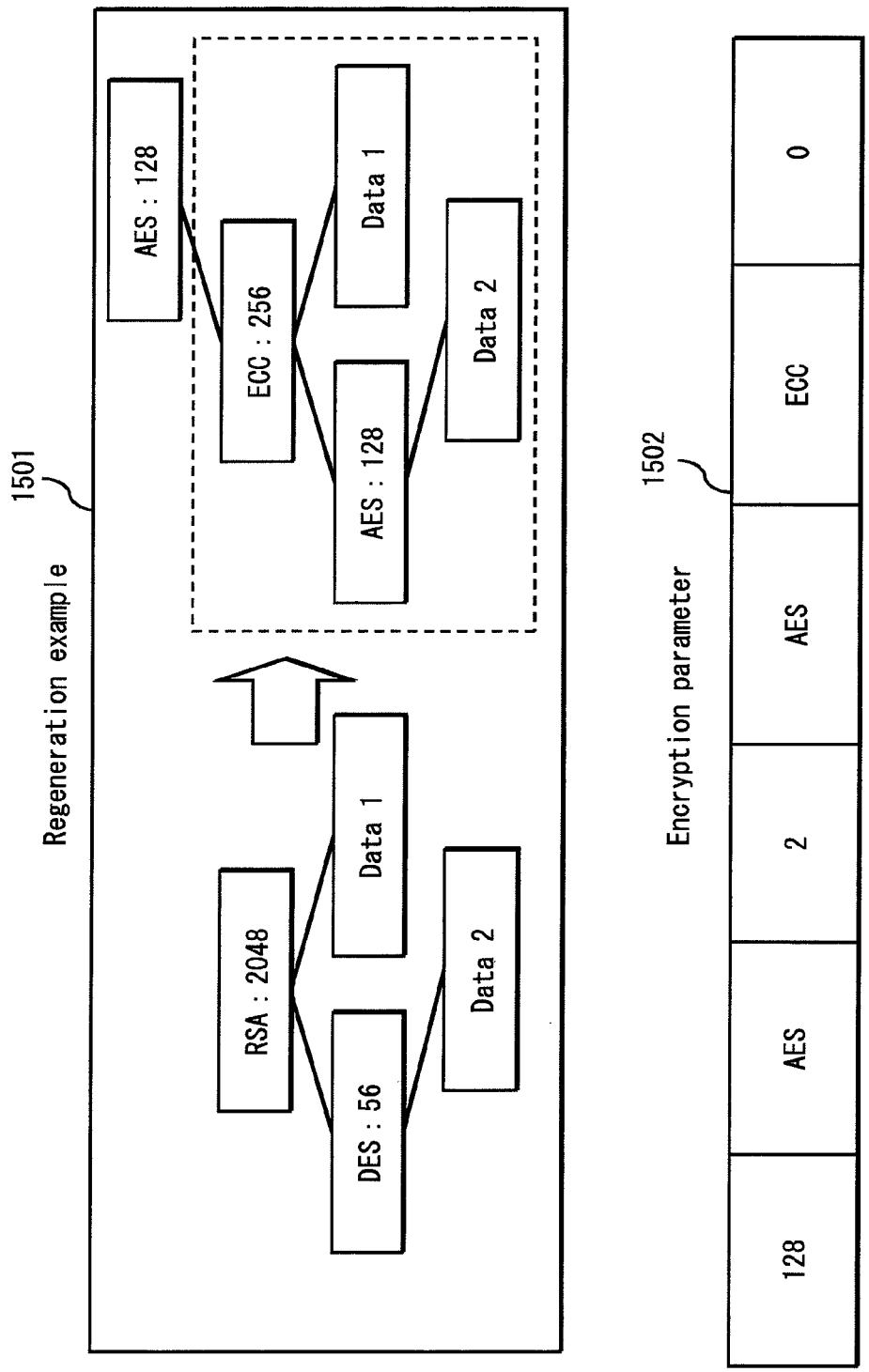
FIG. 15 shows the Migration Package to be regenerated when an encryption parameter 1502 is given thereto in embodiment 1 of the present invention.

FIG. 13 to FIG. 15 respectively show examples of the regeneration operation when the certain encryption parameter 1201 is given to the Migration Package regeneration unit 505 in the Migration Authority 101.

FIG. 13 shows the result after regeneration when the encryption parameter 1302 is given in the case where the Migration package has a tree structure shown in the left side of the regeneration example 1301.

In this example, since the parameter 0 is specified in the (C) the change method constituting the encryption parameter 1302, the Migration Package regeneration unit 505 encrypts only using the master key.

Since the data which is on the top of the tree structure when expanding the Migration Package shows a pair of the public key and the private key whose encryption algorithms are RSA and key lengths therefor are 2048 bits, the Migration Package regeneration unit 505 decrypts them with use of the private key corresponding to the MA pub Key of the Migration Authority 101. And, it encrypts them with use of the master key whose encryption algorithm is AES specified in (B) the master key algorithm and a key length therefor is 128 bits specified in (A) the master key Length. And the part which is enclosed with the dashed line except the master key in the tree structure of the right side of the regeneration example 1301 are regenerated as the Migration Package.

FIG. 14 shows the result after regeneration when the encryption parameter 1402 is given in the case where the Migration package has a tree structure shown in the left side of the regeneration example 1401.

In this example, since the parameter 1 is specified in (C) the change method constituting the encryption parameter 1402, the Migration Package regeneration unit 505 changes all the encryption algorithms.

The following describes the process of each step.

Step 1:

First, since the data which is on the top of the tree structure when expanding the Migration Package shows a pair of the public key and the private key whose encryption algorithms ate RSA and key lengths therefor are 2048 bits, the Migration Package regeneration unit 505 decrypts them with use of the private key corresponding to the MA pub Key of the Migration Authority 101. And it decrypts RSA 1024 bits key pairs and data 1 with use of the RSA 2048 bits private key. And it decrypts data 2 with use of the RSA 1024 bits private key.

Step 2:

Since parameter 2 is specified as (F) the change strength level, the Migration Package regeneration unit 505 regenerates at the same strength level as the strength level of the current Migration Package. According to the encryption strength table 701, the key length for the private key algorithm corresponding to RSA 1024 bits key is 80 bits. But because the minimum key length for AES is 128 bits, it generates 128 bits key and encrypts the data 2 with use of the AES algorithm. And further, According to the encryption strength table 701, the key length for the private key algorithm corresponding to RSA 2048 bits key is 112 bits. But because the minimum key length for AES is 128 bits, it generates 128 bits key and encrypts the AES 128 bits key and the data 1 with use of the AES algorithm. Finally, it encrypts them with use of the master key whose encryption algorithm is AES specified in (B) the master key algorithm and a key length therefor is 128 bits specified in (A) the master key Length, and the part which is enclosed with the dashed line except the master key in the tree structure of the right side of the regeneration example 1401 are regenerated as the Migration Package.

FIG. 15 shows the result after regeneration when the encryption parameter 1502 is given in the case where the Migration package has a tree structure shown in the left side of the regeneration example 1501.

In this example, since the parameter 2 is specified in (C) the change method, AES in (D) the specified private key algorithm, and ECC in (E) the specified public key algorithm, which constitute the encryption parameter 1502, the Migration Package regeneration unit 505 changes all the private key algorithms and the public key algorithms.

The following describes the process of each step.

Step 1:

First, since the data which is on the top of the tree structure when expanding the Migration Package shows a pair of the public key and the private key whose encryption algorithms are RSA algorithm and key lengths therefor are 2048 bits, the Migration Package regeneration unit 505 decrypts them with use of the private key corresponding to the MA pub Key of the Migration Authority 101. And it decrypts DES (Data Encryption Standard) 56 bits key pairs and data 1 with use of the RSA 2048 bits private key. And it decrypts data 2 with use of the DES 56 bits private key.

Step 2:

Since parameter 0 is specified as (F) the change strength level, the Migration Package regeneration unit 505 regenerates at the same strength level as the strength level of the current master key. And DES is a private key encryption, so the key is changed to AES 128 bits key specified in (D) the specified private key algorithm. Therefore, the Migration Package regeneration unit 505 regenerates 128 bits key and encrypts the data 2 with use of the AES algorithm. Next; RSA is a public key encryption, so the key is changed to ECC key specified in (E) the specified public key algorithm. According to the encryption strength table 701, the key length for ECC corresponding to AES 128 bits master key is 256 bits. Therefore, the Migration Package regeneration unit 505 regenerates 256 bits key and encrypts the AES 128 bits key and the data 1 with use of the ECC algorithm. Finally, it encrypts with use of the master key whose encryption algorithm is AES specified in (B) the master key algorithm and a key length therefor is 128 bits specified in (A) the master key Length, and the part which is enclosed with the dashed line except the master key in the tree structure of the right side of the regeneration example 1501 are regenerated as the Migration Package.

Although the master key is sent from the second electronic terminal 103 which downloads the Migration Package here, it may be generated by the Migration Authority 101 side.

These are the explanations of the embodiment 1 of the present invention.

In the following, embodiment 2 of the present invention will be described with reference to the attached drawings.

Embodiment 2

In the embodiment 2, the example in which the Migrate method of confidential data described in the embodiment 1 is applied to a DRM (Digital Rights Management) application is described.

In the embodiment 2, it is assumed that the Local Application 205 described in embodiment 1 is the DRM application. The DRM application is an application for treating digital contents like music and moving images and realizes a copyright protection of them. Also it is an application for realizing a well-kept right management regarding restriction on number of times, period, amount of time when the digital contents are used.

The number of contents that one content management table can manage is preliminarily determined. In FIG. 16, two content management tables 1601 and 1602 are shown. This means that the DRM application manages more contents than the number of contents one content management table can manage.

The content management table 1601 is comprised of a list of content IDs for specifying contents and file names indicated by full paths capable of specifying the destination to store contents. The content ID included in the management table 1601 enables to specify the destination to store content which are stored in the storage area 207. The content management table 1602 has the same structure as that of the content management table 1601.

Figure 17:
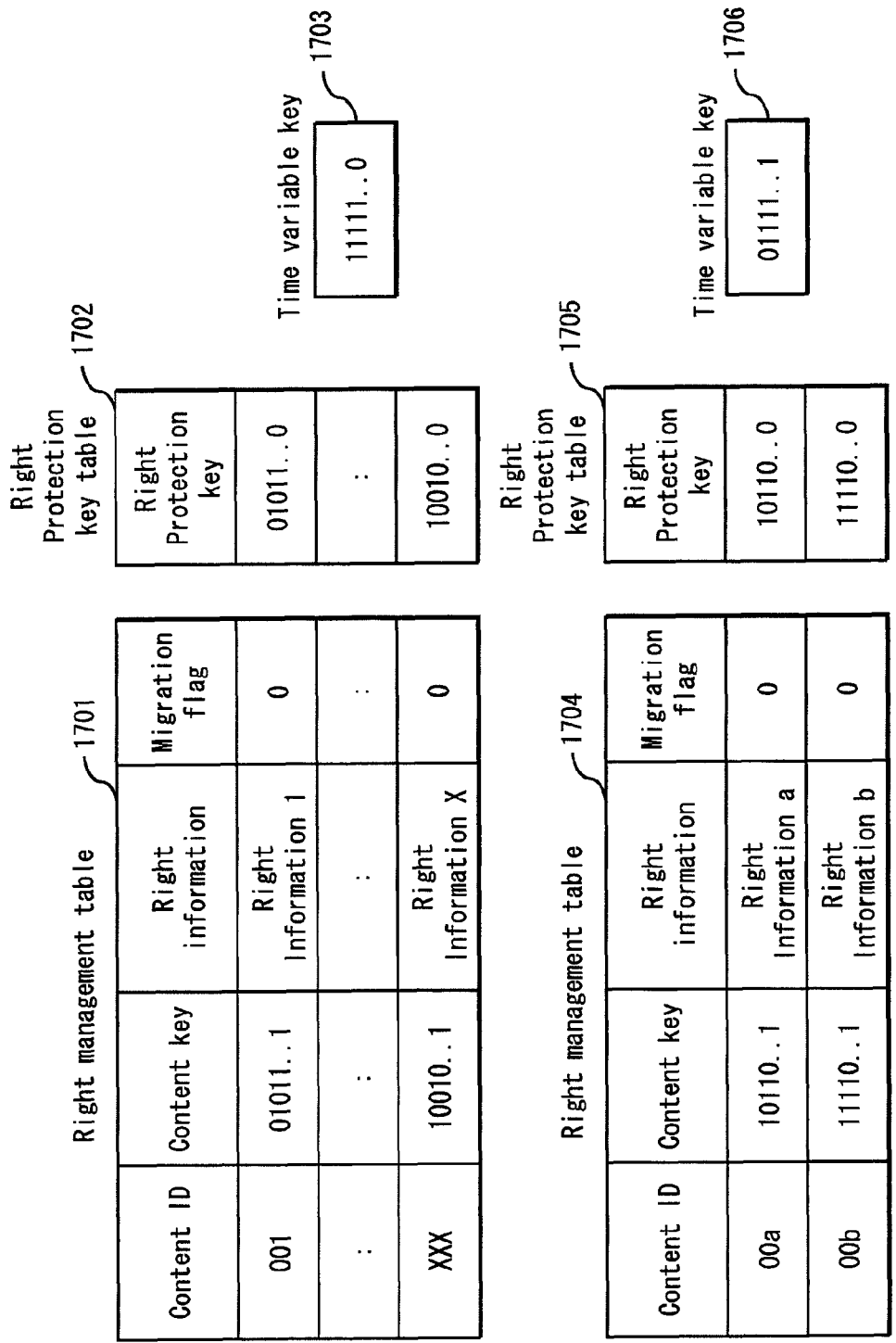
FIG. 17 shows the structure by which a DRM application realizes a copyright protection and a right management in embodiment 2 of the present invention.

FIG. 17 shows the structure by which a DRM application realizes the copyright protection and the right management in embodiment 2 of the present invention.

The right management table 1701 is a table for managing rights of contents which are treated by the DRM application. Entry information in each line includes a content ID, a content key, right information and the like. Each piece of entry information is registered with the right management table at the timing when the content right information is received or at the timing set by an electronic terminal, but the description of the registration process is omitted in this embodiment.

The content ID is an identifier for identifying content. Number information corresponding to a content ID transmitted from a decryption request transmission unit is registered therewith, and the number information is used as a key to search the entry information.

The content key is a decryption key for decrypting the encrypted content indicated by the content ID. If the content is encrypted by AES, the key length therefor is, for example, 128 bits or 192 bits or the like, but it is not limited to them in this embodiment.

The right information is a piece of information for specifying by what kind of right the content indicated by the content ID is managed. The details about the right information are not described here.

A migration flag is a flag showing whether or not content has been uploaded to the Migration Authority 101. "0" means that it has not been uploaded. "1" means that it has been uploaded. When the flag "1" is shown, users cannot play back or migrate the content.

A right management table 1704 has a same structure as that of the right management table 1701 and corresponds to the right management table 1701.

A right protection key table 1702 is a table for managing a right protection key which encrypts each piece of the entry information in the right management table 1701. These pieces of information in the entry information except the content ID are protected by being encrypted with use of the right protection key.

A right protection key table 1705 has a same structure as that of the right protection key table 1702.

A time variable key 1703 is a key for encrypting the right protection key table 1702. It has characteristics of varying a key value as time goes by. The purpose of using this kind of key is to prevent a backup restore attack in managing a right in the DRM application. The backup restore attack is an attack in which a malicious user preliminarily copies data of the right as a backup, and restores the copied data after using up the right. By doing so, the right of the original data will not be used up forever.

A time variable key 1706 has same characteristics as those of the time variable key 1703 and corresponds to the right protection key table 1705.

The time variable key 1703 and the time variable key 1706 are generated by secure time information and a secure counter and the like which will not be fabricated by a user, but the details about the generation method is not described here.

Figure 18:
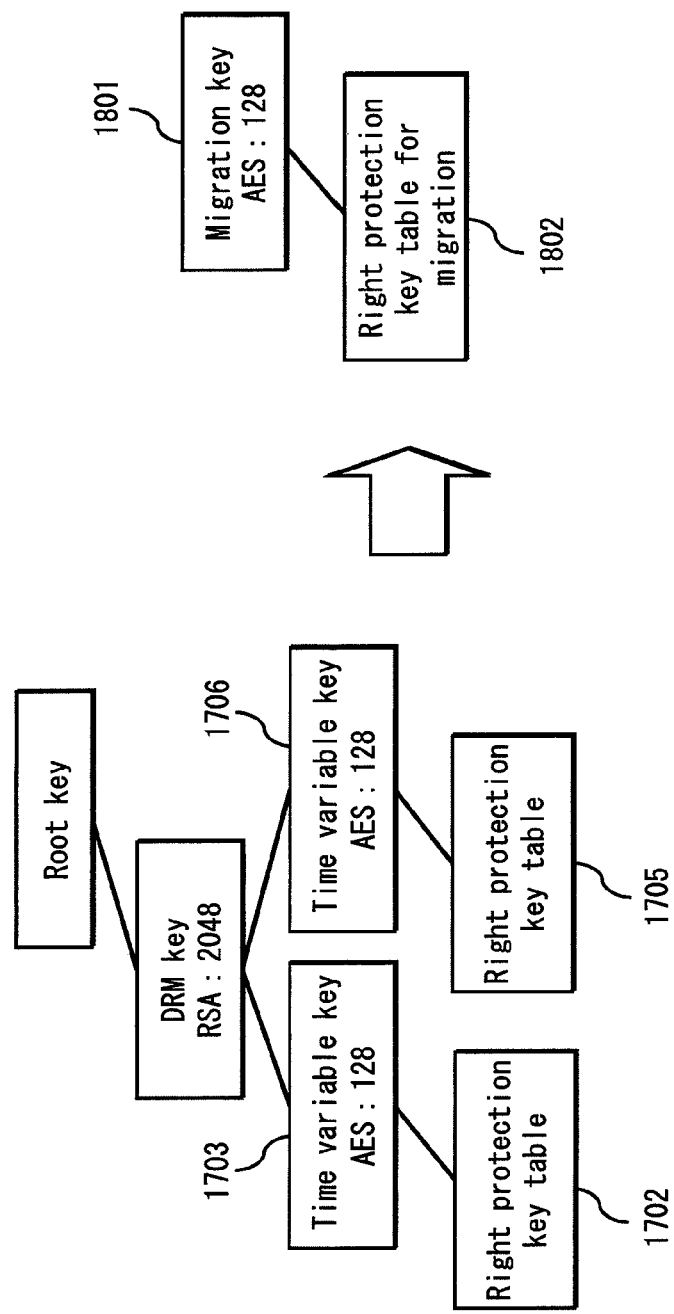
FIG. 18 shows a result of generation of a Migration Package when the DRM application uploads contents in embodiment 2 of the present invention.

FIG. 18 shows that the DRM application manages the time variable key 1703 and the time variable key 1706, and the right protection key table 1702 and the right protection key table 1705 in a tree structure (the left side of the figure), and shows a tree structure of Migration Package generated after the uploading of the contents (the right side of the figure).

The tree structure in the left side of the figure shows that the right protection key table 1702 is encrypted by the time variable key 1703, and the right protection key table 1705 is encrypted by the time variable key 1706. AES is used as the encryption algorithm, and each key length of the time variable keys is 128 bits. And further, the time variable key 1703 and the time variable key 1706 are encrypted by a DRM key corresponding to the DRM application. RSA is used as the encryption algorithm, and key length of the DRM key is 2048 bits.

The tree structure in the right side of the figure shows the result after generation of the Migration Package. The right protection key table for migration 1802 is generated after retrieving the right protection key which encrypts the entry information in the right management table 1701 or the right management table 1704 corresponding to the content ID of the content specified by a user. And the 128 bits migration key 1801 is generated, and the right protection key table for migration are encrypted by using it. AES is used as the encryption algorithm.

Figure 19:
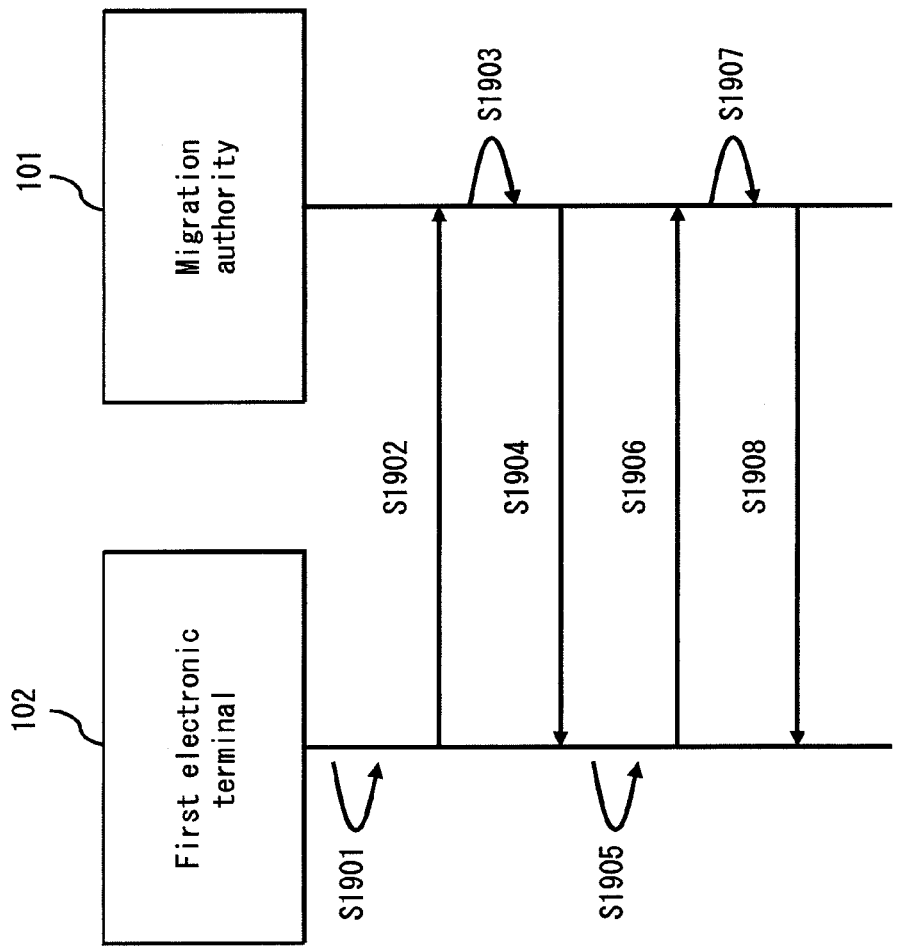
FIG. 19 shows an operation process when the DRM application in the first electronic terminal 102 uploads confidential data to the Migration Authority 101.

FIG. 19 shows an operation process when the DRM application in the first electronic terminal 102 uploads confidential data to the Migration Authority 101.

(S1901) When a user specifies uploading of the content ID 001 in the content management table 1601 managed by the DRM application and the content ID 00a in the content management table 1602 also managed by the DRM application, the first electric terminal 102 prepares for uploading of confidential data.

(a) When receiving the specification of the uploading from the user, the DRM application retrieves the entry information corresponding to the content ID of the specified content from the right management table 1701 or the right management table 1704.

(b) The DRM application generates the right protection key table for migration by using the entry information retrieved in (a).

(c) The DRM application directly transmits the data of the encrypted contents and the right protection key table for migration generated in (b) to the second electronic terminal 103 which operates as a Migrate destination.

Meanwhile, the data of the contents and the right protection key table for migration may be transmitted to the second electronic terminal through a recording medium or through a server which goes through the Migration Authority 101.

(d) The DRM application decrypts the right protection key table 1702 and the right protection key table 1705 with use of the time variable key 1703 and the time variable key 1706 in the Trusted Platform Module 201. And it retrieves the right protection key corresponding to the content ID of the specified content and generates the right protection key table for migration 1802.

(e) The DRM application generates the 128 bits migration key 1801 in the Trusted Platform Module 201 and encrypts the right protection key table for migration 1802. AES is used as the encryption algorithm.

(f) The DRM application generates the Migration Package by using the migration key 1801 and the right protection key table for migration 1802. The details about the Migration Package are not described here because they are described in the Non-Patent document 1.

The processing after the generation of the Migration Package is not described here because it is identical to (S901).

(S1902) The processing is not described here because it is identical to (S902).

(S1903) The processing is not described here because it is identical to (S903).

(S1904) The processing is not described here because it is identical to (S904).

(S1905) The processing is not described here because it is identical to (S905).

(S1906) In the first electronic terminal 102, (a) The DRM application decrypts the right protection key table 1702 and the right protection key table 1705 with use of the time variable key 1703 and the time variable key 1706 in the Trusted Platform Module 201, and retrieves the right protection key corresponding to the content ID of the specified content.

(b) The DRM application decrypts, with use of the right protection key retrieved in (a), the entry information indicated by the content ID "001" in the right management table 1701 and the content ID "00a" in the content management table 1602 which are specified to be uploaded by a user.

(c) The DRM application sets a migration flag "1" in the entry information decrypted in (b).

(d) The DRM application encrypts the entry information indicated by the content ID 001 in the right management table 1701 and the content ID 00a in the content management table 1602 which are specified again to be uploaded by the user with use of the right protection key retrieved in (a).

(e) The DRM application updates the time variable key 1703 and the time variable key 1706, and encrypts again the right protection key table 1702 and the right protection key table 1705 by them.

The following processing is identical to (S906), so the description thereof is omitted.

(S1907) The processing is not described here because it is identical to (S907).

(S1908) The processing is not described here because it is identical to (S908).

These are the description about the operation process when the DRM application in the first electronic terminal 102 uploads confidential data to the Migration Authority 101.

The entry information and the content which is indicated by the migration flag "1" in FIG. 19 (S1906) are controlled by any of the following.

(i) After the second electronic terminal 103 downloads the Migration Package uploaded in FIG. 19, the first electronic terminal 102 is notified of the completion of the downloading, and all pieces of the information corresponding to the content are erased.

(ii) When the Migration Package uploaded in FIG. 19 was not downloaded by the second electronic terminal 103, the migration flag is set back to "0" and it becomes available to be played back in the first electronic terminal 102. Meanwhile, for example, when the management term of the Migration Package in the Migration Authority 101 expires and the expiration is notified to the first electronic terminal 102, the Migration Package may not downloaded by the second electronic terminal 103.

Meanwhile, a digest value of information showing an erasion of the content may be generated by executing the Extend processing formulated by the TCG, and an Attestation processing may be performed using the digest value. These processing are performed in order to allow the Migration Authority 101 to recognize that all pieces of the information relating the content are erased by the first electronic terminal 102 after the second electronic terminal 103 downloads the Migration Package. After the second terminal 103 downloads, the Migration Authority 101 can prevent access from the first electronic terminal 102 as long as the Attestation Processing is not performed.

Also, a concept of a domain is introduced depending on the DRM method. The domain is a concept of treating a plurality of terminals as one group, and it is used for sharing digital contents like music and moving images. The above-mentioned Migration of confidential data may be limited within the domain. In this case, the Migration Authority 101 determines whether or not the first electronic terminal 102 and the second electronic terminal 103 belong to the same domain.

These are the explanations of the embodiment 2 of the present invention.

SUMMARY

As described above, in the present invention, the Migration Authority 101 verifies the security authentication level of the first electronic terminal 102 which operates as a Migrate source of confidential data and the security authentication level of the second electronic terminal 103 which operates as a Migrate destination. Then, the Migration Authority 101 determines the Migrate availability based on the predetermined algorithm. So the confidential data is not mistakenly migrated to the Migrate destination whose authentication level is significantly lower than that of the Migrate source, and can be treated securely.

Also, because the Migration Authority 101 verifies the encryption strength level in information management of the first electronic terminal 102 which operates as a Migrate source of confidential data and the encryption strength level in information management of the second electronic terminal 103 which operates as a Migrate destination, and determines the Migrate availability based on the predetermined algorithm, the confidential data is not mistakenly migrated to the Migrate destination whose authentication level is significantly lower than that of the Migrate source, and can be treated securely.

Further also, the second electronic terminal 103 can regenerates a management structure of the confidential data by the desired encryption algorithm and at the desired encryption strength when downloading the confidential data, the second electronic terminal 103 can manage the confidential data with use of the latest encryption algorithm and at the latest encryption strength which meet the needs of the times. That is, in the present invention, by purchasing the second electronic terminal 103 with the latest encryption algorithm, users can manage the confidential data with use of a high-speed and high-strength encryption algorithm which meet the needs of the times.

MODIFICATIONS

The present invention has been described based on, but is not limited to, the above embodiment. Cases such as the following are included in the present invention.

(1) In the above embodiments, although data transmission/reception between the Migration Authority 101 and the first electronic terminal 102 and between the Migration Authority 101 and the second electronic terminal 103 is assumed to be performed via network like the internet, it may be performed by using a removable recording medium.

(2) In the above embodiments, although the Migration Authority 101 and the first electronic terminal 102 are described to be a different structure, the first electronic terminal 102 may have a function of the Migration Authority 101 and receive a download request for Migration Package from the second electronic terminal 103.

(3) In the above embodiments, although the first electronic terminal 102 as a Migrate source is provided with asymmetric SRK and the second electronic terminal 103 as a Migrate destination is provided with symmetric SRK, the first electronic terminal 102 may be provided with symmetric SRK and the second electronic terminal 103 may be provided with asymmetric SRK.

(4) In the above embodiments, although the AIK credential 210, the information management credential 211, and the Conformance credential 212 are issued by the Migration Authority 101, they may be issued by a third party like a Certificate Authority. In this case, the Migration Authority 101 conducts verification of the AIK credential 210, the information management credential 211, and the Conformance credential 212 by using a certificate issued by the Certificate Authority.

(5) In the above embodiments, although all the tree structure of the managed confidential data is migrated, a user may specify the migration of a part of the tree structure.

(6) In the above embodiments, although all the Migration Package is regenerated by the Migration Authority 101 at one time, if the data size of the Migration Package is large enough, the Migration Package may be regenerated in stages, and may be repeatedly sent to the second electronic terminal 103 each time.

(7) In the above embodiments, although the Migrate availability determination unit 504 makes a determination based on the parameters included in the encryption strength table 701 and the authentication level determination table 801, it may make a determination based on a key update function and key lifetime and the like in the first electronic terminal and the second electronic terminal.

(8) Each of the above-mentioned apparatuses is specifically a computer system comprised of a micro processor, ROM, RAM, a hard disc unit, a display unit, a keyboard, a mouse and the like. A computer program is recorded on the RAM or the hard disc unit. By the micro processor operating in accordance with the computer program, each of the apparatuses achieves its function. Here, the computer program is comprised of a combination of a plurality of instruction codes which each instructs the computer to achieve a predetermined function. Meanwhile, each of the apparatuses is not limited to the computer system comprising all of the micro processor, the ROM, the RAM, the hard disc unit, the display unit, the keyboard, the mouse and the like, it may be a computer system comprising a part of them.

(9) A part or all of the components constituting each of the above apparatuses may be achieved in one system LSI (Large Scale Integration). The system LSI, which is a super-multifunctional LSI manufactured by integrating a plurality of components on one chip, is specifically a computer system comprised of a micro processor, ROM, RAM. A computer program is recorded in the RAM. By the micro processor operating in accordance with the computer program, the system LSI achieves its function.

Also, each component comprising each of the above apparatus may be achieved on one chip, or part or all thereof may be achieved on one chip.

Although the system LSI is taken for an example here, it may be called IC, LSI, super LSI, and ultra LSI, depending on a difference in integration degree. Also, the integrated circuit is not limited to the LSI, and it may be realized by a dedicated communication circuit or a universal processor. It may be realized by a FPGA (Field Programmable Gate Array) operable to program after the LSI being manufactured, or a reconfigurable processor operable to reconfigure a connection or a setup of a circuit cell inside of the LSI.

And further, if a technology of an integrated circuit replacing a LSI comes out by a progress of a semiconductor technology or other derivative technology thereof, naturally the technology may be used for integration of functional blocks. Biotechnology and the like may be applied to this kind of technology.

(10) A part or all of the components constituting each of the above apparatuses may be achieved as an IC card or a single module that is attachable/detachable to or from each apparatus. The IC card or the module is a computer system comprised of a micro processor, ROM, RAM. The IC card or the module may comprise the above super-multifunctional LSI. By the micro processor operating in accordance with the computer program, the IC card or the module achieves its function. The IC card or the module may be tamper resistant.

(11) The present invention may be methods shown by the above. The present invention may be a computer program that allows a computer to realize the methods, or may be a digital signal representing the computer program.

Also, the present invention may be a computer-readable recording medium such as a flexible disk, a hard disk, CD-ROM, MO, DVD, DVD-ROM, DVD-RAM, BD (Blu-ray Disc), or a semiconductor memory having been recorded with the computer program or the digital signal. Furthermore, the present invention may be the digital signal recorded in any of these recording medium.

Also, the present invention may be implemented by transmitting the computer program or the digital signal via a network represented by an electric communication line a wireless or a wired communication line, and the internet, or a data broadcast.

Also, the present invention may be a computer system provided with a micro processor and a memory, the memory records the above computer program therein and the micro processor operates in accordance with the computer program.

Also, other independent computer system may implement the present invention by transferring the recording medium recorded with the computer program or the digital signal, or by transferring the computer program or the digital signal via the network and the like.

(12) The present invention may be any combination of the above embodiments and modifications.

INDUSTRIAL APPLICABILITY

The electronic terminal and the Migration Authority of the present invention are applicable to an industry in which the electronic terminal and the Migration Authority are manufactured and marketed or a service industry in which confidential data is distributed, as a technology for securely migrating the confidential data even when there are electronic terminals having different security authentication levels and strength levels.

The invention claimed is:

1. A migration apparatus for migrating confidential data protected in a first terminal to a second terminal, the migration apparatus comprising:
   a receiving unit operable to receive, from the first terminal, confidential data protected by a first encryption algorithm in a security module in the first terminal, and receive a download request for the confidential data from the second terminal;
   an identification unit operable to identify the first encryption algorithm from a credential transmitted from the first terminal, and identify a second encryption algorithm used in a security module in the second terminal from a credential transmitted from the second terminal along with the download request for the confidential data;
a package management table holding unit holding a package management table for managing the confidential data, a confidential data management method used by the first terminal, an encryption algorithm used by the first terminal, and a key length used by the first terminal;
a package registration unit operable to register, with the package management table, the confidential data management method used by the first terminal, the encryption algorithm used by the first terminal, the key length used by the first terminal, and the confidential data after the confidential data is uploaded from the first terminal;
a security policy table holding unit holding a security policy table that indicates correspondence relationships among key lengths, for a plurality of encryption algorithms including the first and second encryption algorithms, that provide a same encryption strength level;
a determination unit operable to, when receiving the download request from the second terminal, determine whether or not migration is possible in accordance with the security policy table and the second encryption algorithm identified by the identification unit from the credential received from the second terminal along with the download request; and
a control unit operable to:
when the determination unit determines that the migration is possible, (i) re-protect the received confidential data by decrypting the received confidential data by the first encryption algorithm and encrypting the decrypted confidential data by the second encryption algorithm using a corresponding key length for the second encryption algorithm as indicated in the security policy table, so as to provide the same encryption strength level as provided by the first encryption algorithm, and (ii) transmit the re-protected confidential data to the second terminal; and
when the determination unit determines that the migration is not possible, prohibit the confidential data from being transmitted to the second terminal.

2. The migration apparatus of claim 1, wherein the security policy table is transmitted from the first terminal to the migration apparatus.

3. The migration apparatus of claim 1, wherein
the receiving unit receives a master key, a piece of information that indicates an encryption algorithm using the master key, and a piece of information indicating a range of encryption/decryption using the master key, and
the control unit protects only the data which is on a top of a tree structure of the confidential data by using the received master key and the encryption algorithm using the master key, based on the piece of information indicating the range of encryption/decryption using the master key.

4. The migration apparatus of claim 1, wherein
the receiving unit receives a master key and a piece of information that indicates an encryption algorithm using the master key, and
the control unit generates a second key which is different from the received master key, and protects the confidential data by using the second key and the encryption algorithm using the master key.

5. The migration apparatus of claim 4, wherein the control unit generates the second key, which is different from the received master key, on a tier lower than a tier on which the master key is located.

6. The migration apparatus of claim 1, wherein
the receiving unit receives, from the second terminal, a public key and a piece of information that indicates an encryption algorithm using the public key, and
the control unit protects the confidential data by using the received public key and the encryption algorithm using the public key.

7. The migration apparatus of claim 1, wherein
the receiving unit receives, from the second terminal, a private key and a piece of information that indicates an encryption algorithm using the private key, and
the control unit protects the confidential data by using the received private key and the encryption algorithm using the private key.

8. The migration apparatus of claim 1, wherein
the receiving unit receives a master key from the second terminal, and
the control unit protects all of the confidential data at a same level as the encryption strength level indicated by the received master key.

9. The migration apparatus of claim 1, wherein
the receiving unit receives a piece of information indicating an encryption strength level from the second terminal, and
the control unit protects the confidential data at a same level as the encryption strength level indicated by the received piece of information.

10. The migration apparatus of claim 1, wherein
the receiving unit receives, from the second terminal, a piece of information requesting a protection of the confidential data at the same encryption strength level at which the first terminal protected the confidential data, and
the control unit protects the confidential data at the same encryption strength level at which the first terminal protected the confidential data, based on the received piece of information.

11. The migration apparatus of claim 1, further comprising a migration server.

12. The migration apparatus of claim 1, wherein the migration apparatus is included inside the first terminal.

13. The migration apparatus of claim 1, wherein the determination unit determines that:
the migration is possible, when an encryption strength level provided by the second encryption algorithm and the key length used by the security module in the second terminal is equal to or higher than an encryption strength level provided by the first encryption algorithm and the key length used by the security module in the first terminal; and
the migration is not possible, when the encryption strength level provided by the second encryption algorithm and the key length used by the security module in the second terminal is lower than the encryption strength level provided by the first encryption algorithm and the key length used by the security module in the first terminal.

14. The migration apparatus of claim 13 further comprising a second security policy table storing a first security authentication level of the first terminal and a second security authentication level of the second terminal,
wherein the control unit, even when the encryption strength level provided by the second encryption algorithm and the key length used by the security module in the second terminal is equal to or higher than the encryption strength level provided by the first encryption algorithm and the key length used by the security module in the first terminal, prohibits the received confidential data from being re-protected in accordance with the security policy table, as long as a difference between the second security authentication level of the second terminal and the first security authentication level of the first terminal is equal to or higher than a predetermined value.

15. The migration apparatus of claim 13 further comprising a second security policy table storing a first security authentication level of the first terminal and a second security authentication level of the second terminal, wherein the control unit, even when the encryption strength level provided by the second encryption algorithm and the key length used by the security module in the second terminal is equal to or higher than the encryption strength level provided by the first encryption algorithm and the key length used by the security module in the first terminal, prohibits the re-protected confidential data from being transmitted to the second terminal in accordance with the security policy table, as long as a difference between the second security authentication level of the second terminal and the first security authentication level of the first terminal is equal to or higher than a predetermined value.

16. A migration method for migrating confidential data protected in a first terminal to a second terminal, the migration method comprising the steps of:

receiving, from the first terminal, confidential data protected by a first encryption algorithm in a security module in the first terminal;

identifying the first encryption algorithm from a credential transmitted from the first terminal;

holding a package management table for managing the confidential data, a confidential data management method used by the first terminal, an encryption algorithm used by the first terminal, and a key length used by the first terminal;

registering, with the package management table, the confidential data management method used by the first terminal, the encryption algorithm used by the first terminal, the key length used by the first terminal, and the confidential data after the confidential data is uploaded from the first terminal;

holding a security policy table that indicates correspondence relationships among key lengths, for a plurality of encryption algorithms including the first and second encryption algorithms, that provide a same encryption strength level;

receiving a download request for the confidential data from the second terminal;

identifying a second encryption algorithm from a credential transmitted from the second terminal along with the download request for the confidential data;

determining, when the download request is received for the confidential data from the second terminal, whether or not migration is possible in accordance with the security policy table and the second encryption algorithm identified by the identifying of the second encryption algorithm from the credential received from the second terminal along with the download request;

when said determining determines that the migration is possible, (i) re-protecting the received confidential data by decrypting the confidential data by the first encryption algorithm and encrypting the decrypted confidential data by the second encryption algorithm using a corresponding key length for the second encryption algorithm as indicated in the security policy table, so as to provide the same encryption level as provided by the first encryption algorithm, and (ii) transmitting the re-protected confidential data to the second terminal;

and when said determining determines that the migration is not possible, prohibiting the confidential data from being transmitted to the second terminal.

17. A non-transitory computer-readable recording medium having a readable program recorded thereon, the readable program being readable in a migration apparatus for migrating confidential data protected in a first terminal to a second terminal, the readable program causing a computer to execute a method comprising:

receiving, from the first terminal, confidential data protected by a first encryption algorithm in a security module in the first terminal;

identifying the first encryption algorithm from a credential transmitted from the first terminal;

holding a package management table for managing the confidential data, a confidential data management method used by the first terminal, an encryption algorithm used by the first terminal, and a key length used by the first terminal;

registering, with the package management table, the confidential data management method used by the first terminal, the encryption algorithm used by the first terminal, the key length used by the first terminal, and the confidential data after the confidential data is uploaded from the first terminal;

holding a security policy table that indicates correspondence relationships among key lengths, for a plurality of encryption algorithms including the first and second encryption algorithms, that provide a same encryption strength level;

receiving a download request for the confidential data from the second terminal;

identifying a second encryption algorithm from a credential transmitted from the second terminal along with the download request for the confidential data;

determining, when the download request is received for the confidential data from the second terminal, whether or not migration is possible in accordance with the security policy table and the second encryption algorithm identified by the identifying of the second encryption algorithm from the credential received from the second terminal along with the download request;

when said determining determines that the migration is possible, (i) re-protecting the received confidential data by decrypting the confidential data by the first encryption algorithm and encrypting the decrypted confidential data by the second encryption algorithm using a corresponding key length for the second encryption algorithm [s] as indicated in the security policy table, so as to provide the same encryption level as provided by the first encryption algorithm, and (ii) transmitting the re-protected confidential data to the second terminal;

and when said determining determines that the migration is not possible, prohibiting the confidential data from being transmitted to the second terminal.

18. An integrated circuit for use in a migration apparatus for migrating confidential data protected in a first terminal to a second terminal, the integrated circuit comprising:

a receiving unit operable to receive, from the first terminal, confidential data protected by a first encryption algorithm in a security module in the first terminal, and receive a download request for the confidential data from the second terminal;

an identification unit operable to identify the first encryption algorithm from a credential transmitted from the first terminal, and identify a second encryption algorithm used in a security module in the second terminal from a credential transmitted from the second terminal along with the download request for the confidential data;

a package management table holding unit holding a package management table for managing the confidential data, a confidential data management method used by the first terminal, an encryption algorithm used by the first terminal, and a key length used by the first terminal;

a package registration unit operable to register, with the package management table, the confidential data management method used by the first terminal, the encryption algorithm used by the first terminal, the key length used by the first terminal, and the confidential data after the confidential data is uploaded from the first terminal;

a security policy table holding unit holding a security policy table that indicates correspondence relationships among key lengths, for a plurality of encryption algorithms including the first and second encryption algorithms, that provide a same encryption strength level;

a determination unit operable to, when receiving the download request from the second terminal, determine whether or not migration is possible in accordance with the security policy table and the second encryption algorithm identified by the identification unit from the credential received from the second terminal along with the download request; and a control unit operable to:
  when the determination unit determines that the migration is possible, (i) re-protect the received confidential data by decrypting the received confidential data by the first encryption algorithm and encrypting the decrypted confidential data by the second encryption algorithm using a corresponding key length for the second encryption algorithm as indicated in the security policy table, so as to provide the same encryption strength level as provided by the first encryption algorithm and (ii) transmit the re-protected confidential data to the second terminal; and
  when the determination unit determines that the migration is not possible, prohibit the confidential data from being transmitted to the second terminal.

* * * * *